US006324516B1

United States Patent
Shults et al.

(12) United States Patent
(10) Patent No.: US 6,324,516 B1
(45) Date of Patent: Nov. 27, 2001

(54) SYSTEM AND APPARATUS FOR UTILIZATION REVIEW OF MEDICAL CLAIMS

(76) Inventors: Matthew P. Shults, 10192 Robin Ave., Fountain Valley, CA (US) 92708; Scott R. Smith, 5 Windridge, Aliso Viejo, CA (US) 92656; Diane C. Altwies, 2233 Martin St., #208, Irvine, CA (US) 92715; Michelle T. Delizio, 339 Ledroit St.; Robert L. Kaaren, 421 Ledroit La., both of Laguna Beach, CA (US) 92651; Mishel E. Munayyer, 27431 Trabuco Cir., Mission Viejo, CA (US) 92692

( * ) Notice: Subject to any disclaimer, the term of this patent is extended or adjusted under 35 U.S.C. 154(b) by 0 days.

(21) Appl. No.: 09/070,272

(22) Filed: Apr. 30, 1998

Related U.S. Application Data

(63) Continuation of application No. 08/873,197, filed on Jun. 11, 1997, now abandoned.

(51) Int. Cl.⁷ ............................................... G06F 17/60
(52) U.S. Cl. .................................... 705/2; 705/3
(58) Field of Search .......................... 705/1, 2, 3, 4, 705/8, 9

(56) References Cited

U.S. PATENT DOCUMENTS

| | | | | |
|---|---|---|---|---|
| 5,253,164 | * | 10/1993 | Holloway et al. | 705/2 |
| 5,301,105 | * | 4/1994 | Cummings, Jr. | 705/2 |
| 5,325,293 | * | 6/1994 | Dorne | 705/2 |
| 5,557,514 | * | 9/1996 | Sear et al. | 705/2 |
| 5,784,635 | * | 7/1998 | McCallum | 712/32 |
| 5,819,228 | * | 10/1998 | Spiro | 705/2 |
| 5,835,897 | * | 11/1998 | Dang | 705/2 |
| 5,845,254 | * | 12/1998 | Lockwood et al. | 705/2 |
| 5,970,463 | * | 10/1999 | Cave et al. | 705/3 |

FOREIGN PATENT DOCUMENTS

WO-9503659-A2 * 2/1995 (WO) .

OTHER PUBLICATIONS

Update on Software That Supports UM Clinical Decision–Making, Medical Utilization Management, Feb. 20, 1997, vol. 205, No. 4.*

Robert Ceniceros, UR Providers Evolving To Manage Utilization, Not Just Review It, Business Insurance, Feb. 3, 1997, vol. 31, No. 5, p. 3.*

Pamela Taulbee, Outcomes Management: Buying Value and Cutting Costs; When Healthcare Becomes Less Like Roulette, Efficiency and Effectiveness Can Be Rewarded, Business and Health, vol. 9, No. 3, p. 28.*

* cited by examiner

Primary Examiner—Tariq R. Hafiz
Assistant Examiner—J Horle
(74) Attorney, Agent, or Firm—Knobbe, Martens, Olson & Bear LLP

(57) ABSTRACT

A medical cost containment system for ensuring that the anticipated cost savings from utilization review (UR) agreements are actually realized. The UR agreements are essentially contractual agreements that specify the type and quantity of medical treatments relating to a specific claim resulting from a specific injury. Each UR agreement comprises a claim number, a procedure code describing the particular medical service authorized, and some indication as to dates or quantity of service authorized. All of the UR agreements are stored in a UR database. When a medical bill is received by the insurance company, the bill is entered in to the computer. The cost containment system searches all UR agreements in the UR database which have the same claim number as the claim number on the bill. For each item in the medical bill, the system finds the UR agreement which most closely matches the procedure code in the line item and various other criteria, such as the dates of treatment. The system then checks to ensure that the item in the bill is authorized by the UR agreement. If the item is authorized, then payment is made. If the item is not authorized, then the item is flagged for further review.

31 Claims, 20 Drawing Sheets

BILL RECORDS

- CLAIM NUMBER — 501
- DATE OF SERVICE — 502
- PROCEDURE CODE — 503
- COST — 504
- PROCEDURE CODE MODIFIER — 505
- RULE LEVEL — 506
- RULE SEQUENCE NUMBER — 507
- BIND FLAG — 508
- MAND. FLAG — 509

FIG. 5

CASE HEADER RECORD — 600

| Field | Ref |
|---|---|
| UR VENDOR CASE ID | 602 |
| CARRIER CLAIM NUMBER | 603 |
| CLAIMANT SSN | 604 |
| CLAIMANT NAME | 606 |
| CLAIMANT ADDRESS | 609 |
| CLAIMANT DATE OF INJURY | 613 |
| UR VENDOR CASE COST | 614 |
| DATE OF UR REQUEST | 615 |
| UR REQUEST TYPE | 616 |
| PRIMARY DIAGNOSIS | 617 |
| 2nd DIAGNOSIS | 618 |
| 3rd DIAGNOSIS | 619 |
| 4th DIAGNOSIS | 620 |
| 5th DIAGNOIS | 621 |
| OPEN STATUS | 622 |
| PPO IDENTIFIER | 623 |

FIG. 6

PROVIDER RECORD — 700

| Field | Ref |
|---|---|
| UR VENDOR REVIEW ID | 702 |
| TYPE OF PROVIDER | 703 |
| PROVIDER'S IRS NUMBER (TIN) | 704 |
| PROVIDER'S NAME | 706 |
| FACILITY NAME | 707 |
| PROVIDER'S ADDRESS, PHONE | 708 |
| BILLING ADDRESS, PHONE | 715 |

FIG. 7

UR RECORD 800

| Field | Ref |
|---|---|
| UR VENDOR CASE ID | 802 |
| UR VENDOR REVIEW ID | 803 |
| TYPE OF UR RECORD | 804 |
| DATE OF SSERVICE: FROM | 805 |
| DATE OF SERVICE: TO | 806 |
| PROCEDURE CODE: FROM | 808 |
| PROCEDURE CODE: TO | 809 |
| UR MODIFIER: FROM | 810 |
| UR MODIFIER: TO | 811 |
| CLIENT TYPE OF BILL (SERVICE) | 812 |
| PLACE OF SERVICE | 813 |
| TREATMENT AREA | 814 |
| QUANTITY OF TREATMENTS | 815 |
| ACTIVITY TYPE | 816 |
| FREQUENCY OF TREATMENTS | 817 |
| PPO IDENTIFIER | 818 |
| REASON FOR UR | 819 |
| UR ACTION | 820 |
| UR NURSE'S RESULTS | 821 |
| REQUEST DATE FOR PHYSICIAN ADVISOR | 822 |
| PHYSICIAN ADVISOR RESULTS | 823 |
| DESCRIPTION OF AUTHORIZATION | 824 |
| FEE SCHEDULE DISCOUNT | 825 |
| NEGOTIATED FLAT RATE AMOUNT | 826 |
| UR VENDOR REVIEW COST | 827 |
| DATE OF UR REVIEW | 831 |
| DATE PROVIDER REQUESTED PRE-AUTHORIZATION | 832 |
| OPEN STATUS | 833 |
| UR REQUEST TYPE | 834 |

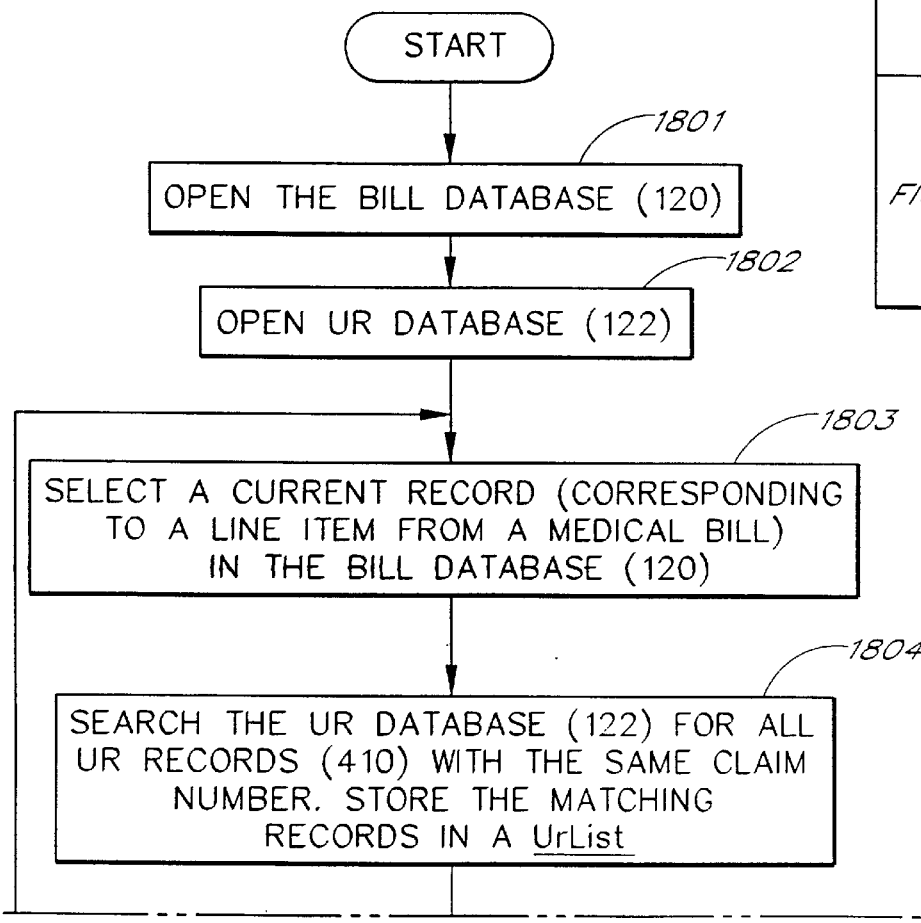

SYSTEM AND APPARATUS FOR UTILIZATION REVIEW OF MEDICAL CLAIMS

This application is a continuation of U.S. Ser. No. 08/873,197 filed Jun. 11, 1997, now abandoned.

BACKGROUND OF THE INVENTION

1. Field of the Invention

This invention relates to a computerized medical payment system and more particularly, to a system for correlating utilization review (UR) agreements with actual requests for payment of medical bills.

2. Background

The escalating cost of medical care, especially in the area of workers compensation, has led many insurance companies to adopt a strategy known as managed care. A primary component of managed care is a set of rules that specify, for a given injury, the type of treatments, and the quantity of such treatments which are allowed. These rules come from several different sources, namely state regulations, preferred provider organization (PPO) agreements between the providers and payors, and private rules written by the insurance companies. Most of the fifty states have formulated rules covering the type and quantity of medical treatments which are allowable and under what conditions they are allowable based on a given injury. Some state rules are very specific and leave little room for adjustment. Other states' rules are rather loose and function more in the nature of guidelines. PPO agreements are blanket agreements between payors, providers and patients that, like the state rules, list the types and quantity of medical treatments that will be authorized for a given diagnosis. Most PPO agreements also specify the maximum allowable fees for various medical services.

The rules which govern the authorization of managed care treatment are generally applied according to a rule hierarchy, with state rules preempting all others. Many payors create a specific set of rules that govern the authorization of treatments; these rules are generally obtained from statistically and clinically derived norms based on historical treatment patterns for similar injuries. In those situations where the payor has no specific rules, the UR vendor uses a set of generic rules which are generally based on industry wide norms. In all cases, the application of rules proceeds from top to bottom. First the state rule is applied, then the PPO rules, then the payor's specific or generic rules.

In addition to the rules discussed above, a process known as utilization review (UR) has become an important part of managed care, especially in states with less specific rules. UR is the process whereby a pre-treatment agreement, which outlines the nature and quantity of the authorized medical treatments, is negotiated between the provider and the payor. Then the medical bills from the provider are reviewed, either by the payor or a UR vendor hired by the payor, to ensure that the agreements have been honored. Under a typical UR scenario, the provider diagnoses the injury, determines what treatment is needed, and then calls the payor for authorization. The payor's agent, typically a nurse, uses the provider's diagnosis, and based on the type of injury and other factors, such as the patients age and prior medical history; determines what treatments are to be authorized.

If the provider, in his or her professional judgment, is satisfied with treatment plan agreed to by the payor, then an agreement, (known as a "UR agreement") is formed which sets forth the agreed-upon payment terms for the treatment of the patient. If the provider is not satisfied, then further negotiations are required. In most states, a nurse cannot override the professional judgment of a physician. Thus, if the provider is not satisfied with the treatment plan offered by the payor, then, typically, a physician employed by the payor steps in to negotiate the UR agreement. Once the UR agreement is reaccuse, the payor calculates a cost savings based on the difference between the requested treatment and what was actually authorized. Ideally, the provider then treats the patient according to the agreed upon services and sends the bills to the payor for payment.

For example, a provider might request a hospital stay of five days for a particular patient. The payor, after evaluating the injury, and based on the provider's diagnosis, might conclude that a stay of only three days is sufficient. The payor offers three days, and after due consideration, the provider concurs, and an agreement is reached. Once this agreement has been reached with the provider, the payor enters into its books a cost savings equivalent to the difference in cost between the requested treatment and the recommended treatment, which in this example would be the cost of two days of hospitalization.

A significant problem in the art of UR has been the inability for payors to effectively correlate the UR agreements with the bills actually received and paid. Thus, in the example above, if the patient stayed in the hospital for five days, instead of the authorized three, the payor might be billed for, and might pay for, five days. This inability to effectively correlate the agreements to the bills has arisen in part from the sheer volume and complexity of the UR agreements and medical bills being processed. The payors have been unable to use computers to automate this task because there has existed no method to code the UR agreement and the medical bill into forms that can be used by the computer, and no method to compare UR agreements to the medical bills. This inability to enforce the UR agreements has resulted in frequent overpayments, and rendering the cost savings attributed to the UR agreements generally illusory.

From the above discussion, it becomes clear that a complete medical bill processing system must check the entire bill against the applicable rules and locate any and all UR agreements which affect the amount to be paid. This task is daunting because each medical bill is a multi-line, itemized listing of complex medical services provided to the patient by one or more providers. Each line comprises a description of the service rendered and the charge for that service. Each line also comprises a procedure code which is a numeric code that indicates which services was provided.

Methods of enforcing the state administrative rules are known in the prior art. For example, U.S. Pat. No. 4,987,538 to Johnson, teaches a method for automated processing of the state rules that govern provider billings. In the method of Johnson, the rules are converted into procedure codes and stored. As bills are received by the payor they are converted to procedure codes and compared to the coded state rules. When a state rule is found to cover the treatment specified in a particular billing, then that rule is applied to the bill. Johnson also teaches the method of checking multiple billings for potential duplication. Unfortunately, the method of Johnson is inapplicable to the task of correlating UR agreements to the provider billings because of the additional complexities that arise in coding the UR agreements. The present invention discloses a method for performing the much more difficult task of correlating UR agreements to medical b,ills.

The difficulty in coding the UR agreements arises because of the complex nature of medical services, the time delay between the authorization of treatment and the receipt of bills for that treatment, the complex nature of medical bills, and finally, the fact that UR agreements are negotiated on a case by case basis. Unlike UR agreements, the various rule systems, whether state rules, PPO rules, or provider rules, are independent of any particular patient or provider. When a particular rule applies to a particular treatment, the rule is always applied. Thus the task of correlating procedure codes in a medical bill is relatively simple. The bill processing system can look for an exact match between the procedure code in the medical bill and the procedure code in the rule database. If a match is found, then the rule is applied. If the provider entered the wrong code on the bill, and thus triggered the wrong rule, the error lies with the provider and it is solely the provider's responsibility.

By contrast, UR agreements are contracts which are negotiated between the provider and the payor. The payor enters a procedure code in the coded UR agreement, and the provider enters a procedure code in the bill. Both are responsible for entering the right code, and thus both are responsible for errors and misunderstandings. Unfortunately, the complex nature of medical services means that the coding is imperfect, and therefore the code used in the UR agreement may not match the codes used in the itemized bill. Thus a bill review processing system which simply looks for exact matches between procedure codes would often miss the correlation between a UR agreement and items in a bill. The present invention solves this problem by recognizing imperfect matches and then looking for the best match from a set of imperfect matches.

Two other factors complicate the coding and subsequent correlation of UR agreements to medical bills. The rule processing system discussed above does not suffer from these added complexities. First, there is no simple relationship between, a UR agreement and a medical bill. A single medical bill may relate to many UR agreements and a single UR agreement may relate to many medical bills. The second difficult arises from the fact that UR agreements, as stored in a database, are transitory. Thus errors in the database, such as an improper procedure code, are far more difficult to detect and correct than errors in the relatively static rule database. Here again, the process of looking for the best match from a list of imperfect matches greatly mitigates these problems and simultaneously increases the number of matches found while minimizing the number of erroneous matches.

SUMMARY OF THE INVENTION

The present invention solves the foregoing problems by providing a complete medical cost containment system for ensuring that the anticipated cost savings from managed care in general, and utilization review (UR) in particular, are actually realized. The system prioritizes and audits medical bills sent to a medical service payor, such as an insurance company, by a medical service provider, such as a physician The medical bills are audited for the following: compliance with state, PPO, and provider rules; compliance with any UR agreements negotiated between the provider and the payor, and duplicate billing. Each UR agreement comprises a claim number, a procedure code describing the particular medical service authorized, and some indication as to dates or quantity of service authorized. The UR agreements are coded and stored in a UR database. The coding of UR agreements can either be by direct data entry from a workstation, or by electronic data import (EDI) or optical character recognition import (OCI). Medical bills are received from a physician or other medical service provider and comprise multi-line itemized requests for payment. The medical bills are coded, line by line, using methods similar to that used for the UR agreements, and stored in a database of medical bills. In a preferred embodiment, each item from the medical bill corresponds to one record in the UR database. The cost containment system searches the UR database to determine which UR agreements apply to each record in the bill database.

The cost containment system searches all UR agreements in the UR database which have the same claim number as the claim number on the bill. For each item in the medical bill, the system finds the UR agreement which most closely matches the procedure code in the line item and various other criteria, such as the dates of service. The system then checks to ensure that the item in the bill is authorized by the UR agreement. If the item is authorized, then the line is flagged for payment. If the item is not authorized, then the line is flagged for further review.

In a particularity preferred embodiment, the procedure codes are industry standard AMA CPT-4 codes or statutory Relative Value Schedule (RVS) Codes. The CPT-4, and RVS codes are five digit codes wherein changes in the digits of least significance reflect closely related treatments. The preferred embodiment exploits this structure of the CPT-4 and RVS codes in attempting to correlate the UR agreements and items by allowing less than perfect matches between the procedure codes in the UR agreement and the medical bills. Thus, in the preferred embodiment, the UR agreements are matched to the medical bills by looking for the best match from a list of imperfect matches.

In another embodiment, the system finds a list of all of the UR agreements which have some probability of applying to a particular line in a medical bill and presents that list visually on-line to a human operator who can choose to apply any particular UR agreement to all items in a bill, to one item in a bill, or none of the items in a bill.

In another embodiment, the invention comprises a method for correlating items in a bill for services with one or more service authorization agreements. For each item in the bill, the method involves finding the service authorization agreement which most closely matches the services listed in the bill The matching can be based on alphanumeric codes describing various services. In one embodiment the method involves finding a closest match between an alphanumeric code in the service authorization agreement and an alphanumeric code in the bill for services by matching as many characters as possible. The matching process can include various additional criteria, such as the dates of service, quantity of service, etc. These additional criteria are especially useful when an exact match cannot be found between the code in the service authorization and the code in the bill for services. Once a match is found, the system then checks to ensure that the item in the bill is authorized by the service authorization agreement. If the item is authorized, then the line is flagged for payment. If the item is not authorized, then the bill is flagged for further review.

BRIEF DESCRIPTION OF THE DRAWINGS

These and other aspects, advantages, and novel features of the invention will become apparent upon reading the following detailed description and upon reference to accompanying drawings in which:

FIG. 5 illustrates the fields in a bill record found in a bill database;

FIG. 6 illustrates the fields in a review case header record;

FIG. 7 illustrates the fields in a provider record;

FIG. 8 illustrates the fields in a UR record;

FIG. 15 illustrates one embodiment of a dialog page for manipulating the details of a UR;

In the drawings, the first digit of any three-digit number indicates the number of the figure which best illustrates the element. For four-digit numbers, the first two digits indicate the figure number. Like reference numbers in different figure refer to the same element.

DETAILED DESCRIPTION OF THE PREFERRED EMBODIMENT

I. Detailed Description of the Drawings

Figure 1:
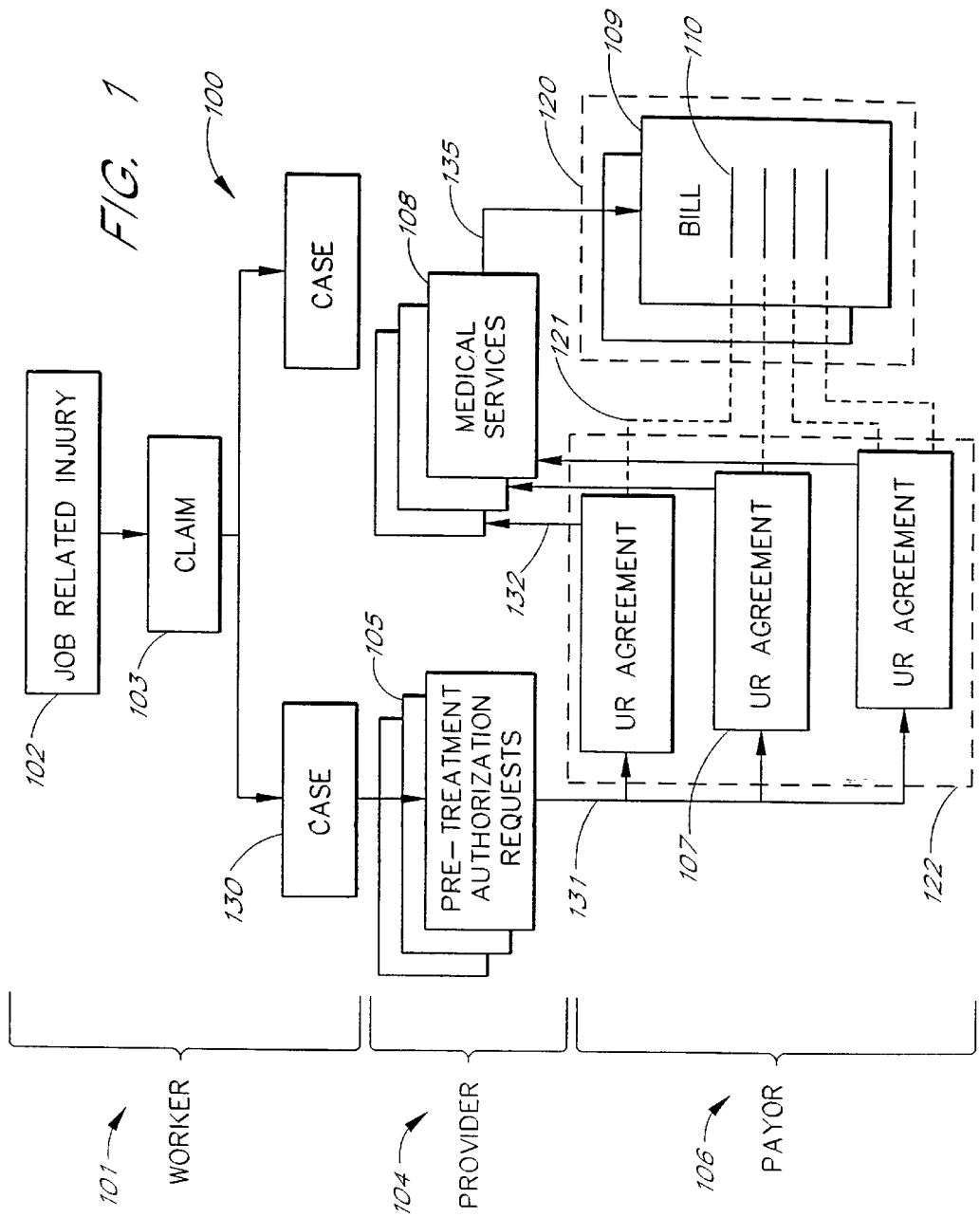
FIG. 1 is a block diagram illustrating generally the elements of a managed care system.

FIG. 1 is a high level drawing illustrating a preferred embodiment of a managed care system 100 and will be used to describe the basic process used to implement UR in accordance with the invention. In a typical scenario, a worker 101 suffers a job-related injury 102 and files a claim 103 which may ultimately result in one or more cases 130. The worker 101 then contacts a medical service provider 104 for medical treatment. After diagnosing the injury 102 and deciding on the necessary treatment, the medical service provider 104 makes one or more pretreatment authorization requests 105 to a medical service payor 106. These pretreatment authorization requests 105 results in one or more UR agreements 107. Each UR agreement 107 negotiated between the provider 104 and the payor 106, and specifies the type and maximum quantity of medical services to be provided on the claim 103. The payor 106 enters the UR agreements into a UR database 122. The payor may also organize the claim into a series of cases 130. Once the UR agreements 107 have been made, the service provider 104 provides a series of medical services 108 to the worker 101. The medical services 108 result in a series of bills, 109. Each bill comprises a series of lines 110 where each line 110 itemizes a specific medical treatment. There is a correspondence 121 between lines 110 in the bill 109 and tie UR agreements 107. In general, each line 110 corresponds to one and only one utilization review agreement 107. The payor 106 stores the bills 109 in a billing database 120.

Figure 2:
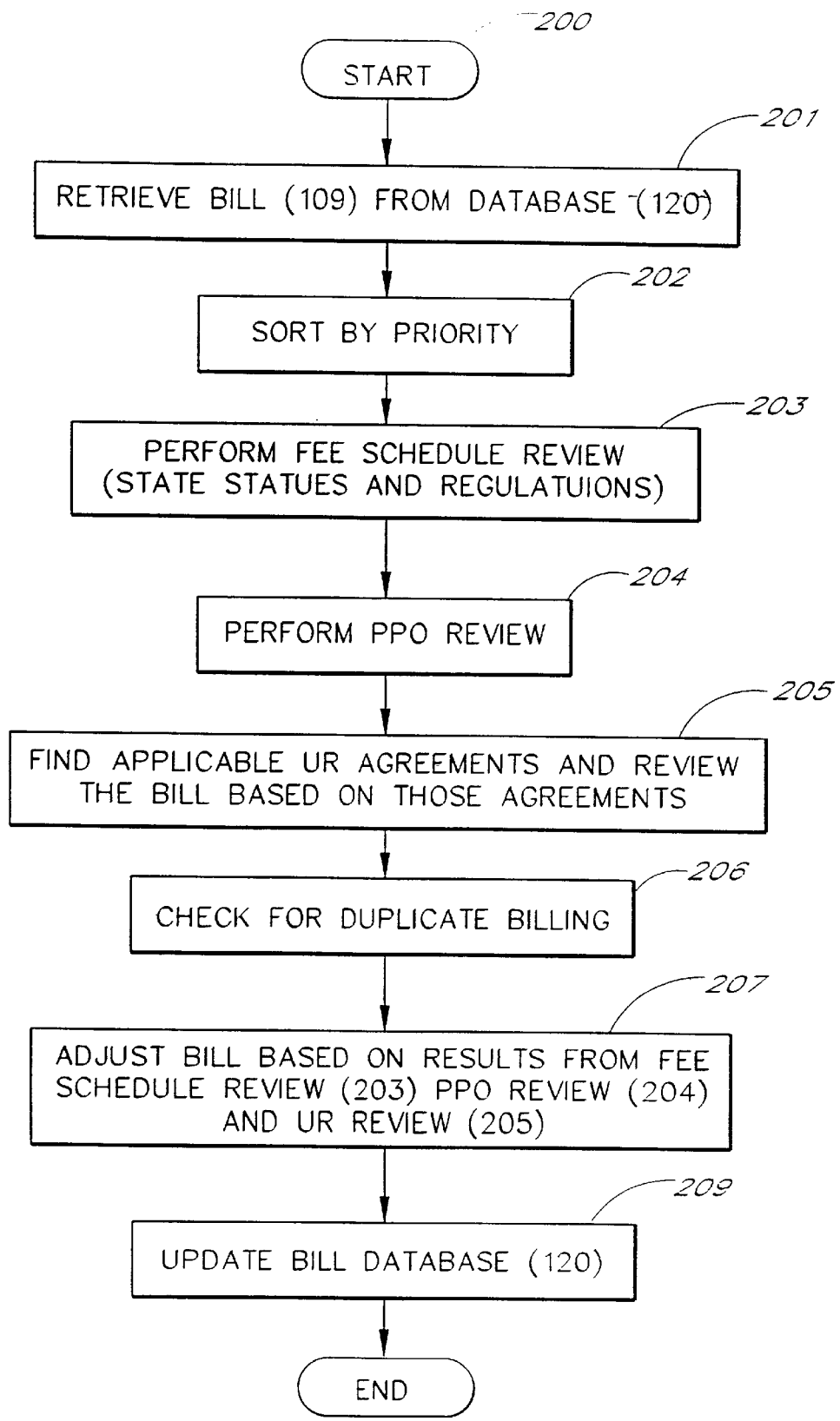
FIG. 2 is an overview flowchart illustrating generally the process steps involved in bill review processing.

FIG. 2 shows a flowchart summarizing how a bill review processing procedure is implemented by the payor 106. The flowchart begins at a start block 200 and proceeds immediately to a process block 201 where the bill 109 is retrieved from the billing database 120. Proceeding to a process block 202, the data is sorted by priority so that the highest priority bills can be processed first. Proceeding to a rule process block 203, the data undergoes a fee schedule review where the various state statutes and regulations that relate to the services provided in the bill are applied. Proceeding to a PPO process block 204, the data undergoes review based on contracts with preferred provider organizations (PPO). The PPO contracts define pre-arranged fee schedules between the PPO and the payor 106. These contracts are similar in nature to the statutory fee schedules of the rule process block 203 except that they are private agreements between organizations. Processing then proceeds to a UR process block 205 where the bill is checked against the UR agreements 107. In the process block 205 each line 110 of the bill is correlated to one of the utilization agreements 107. Processing then proceeds to a process block 206 where each line 110 is checked to make sure that it is not duplicated in a different bill 109 that has already been paid. Processing then proceeds to a process block 207 where the restraints imposed by the state regulations, the PPO agreements, and the utilization review agreements are actually applied. In the process block 207 each line 110 is repriced to contain the lowest quantity of service, at the lowest price authorized by the restraints found in the rule process block 203, the PPO process block 204, and the UR process block 205. Processing then proceeds to a final process block 209 where the data in the billing database 120 is updated to reflect the repriced bill 109.

Figure 3:
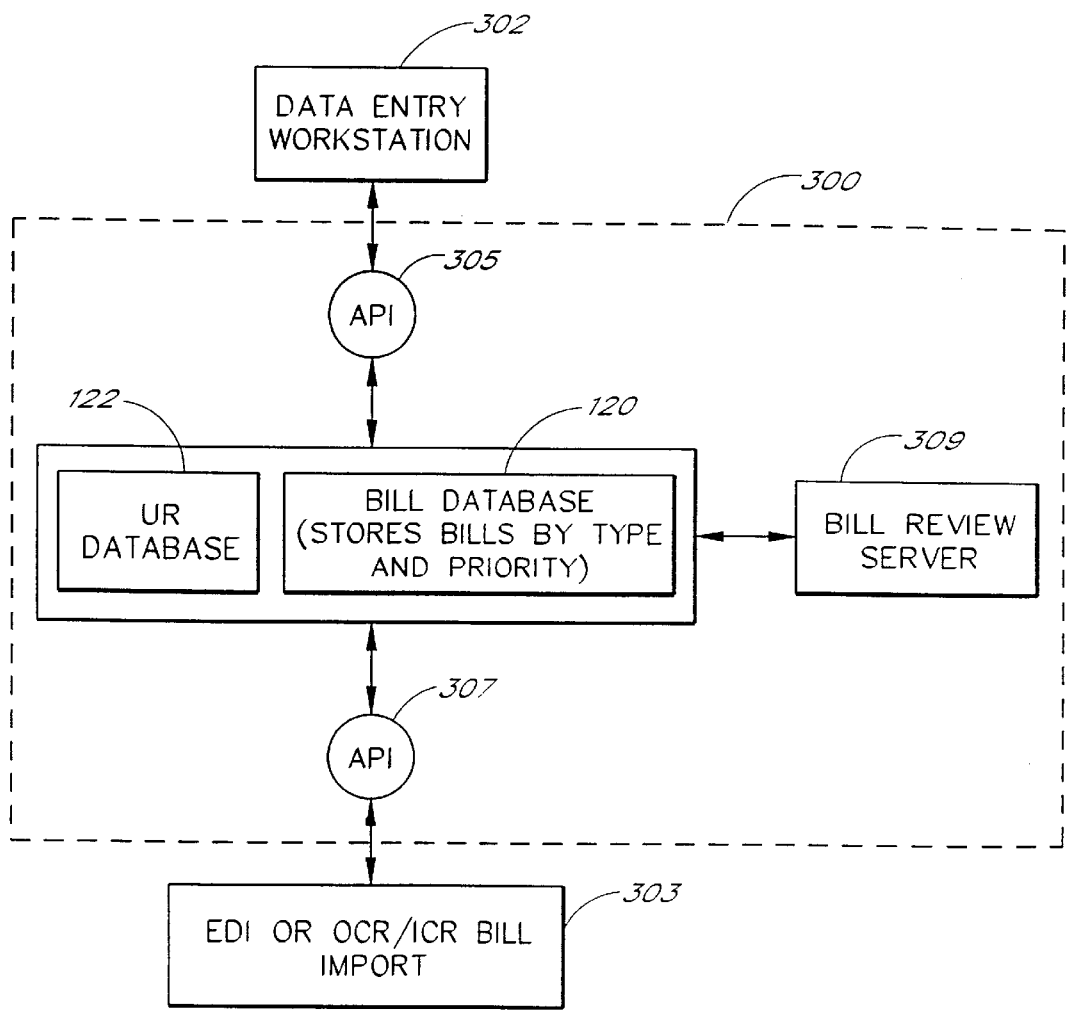
FIG. 3 is a block diagram illustrating a preferred system hardware and software architecture.

FIG. 3 shows an overview of the preferred hardware/software architecture of a bill review system. The medical bills 109 are stored in the bill database 120 which stores the medical bills sorted by type and priority and the UR database 122 which stores the UR agreements 107. The bill databases 120 and the UR database 122 advantageously provide an application programming interface (API) 305 which allows a data entry workstation 302 to be used to enter, retrieve, and manipulate the data therein. Data from the UR agreements 107 and the medical bills 109 are entered by a user using the data workstation 302. The bill database 120 and the UR database 122 also advantageously provide a secondary API 303 which allows manipulation of both databases by electronic data exchange or optical character recognition 303. The bills 109 are retrieved from the bill data base 120, and the UR agreements 107 are retrieved from their respective databases by a bill review server workstation 309 where the bills 109 are processed according to the general steps of the flowchart in FIG. 2, and more specifically by the flowcharts in figure 18. As shown in the FIG. 2., once the bills 109 have been processed in the workstation 309, they are returned to the bill database 120.

Figure 4:
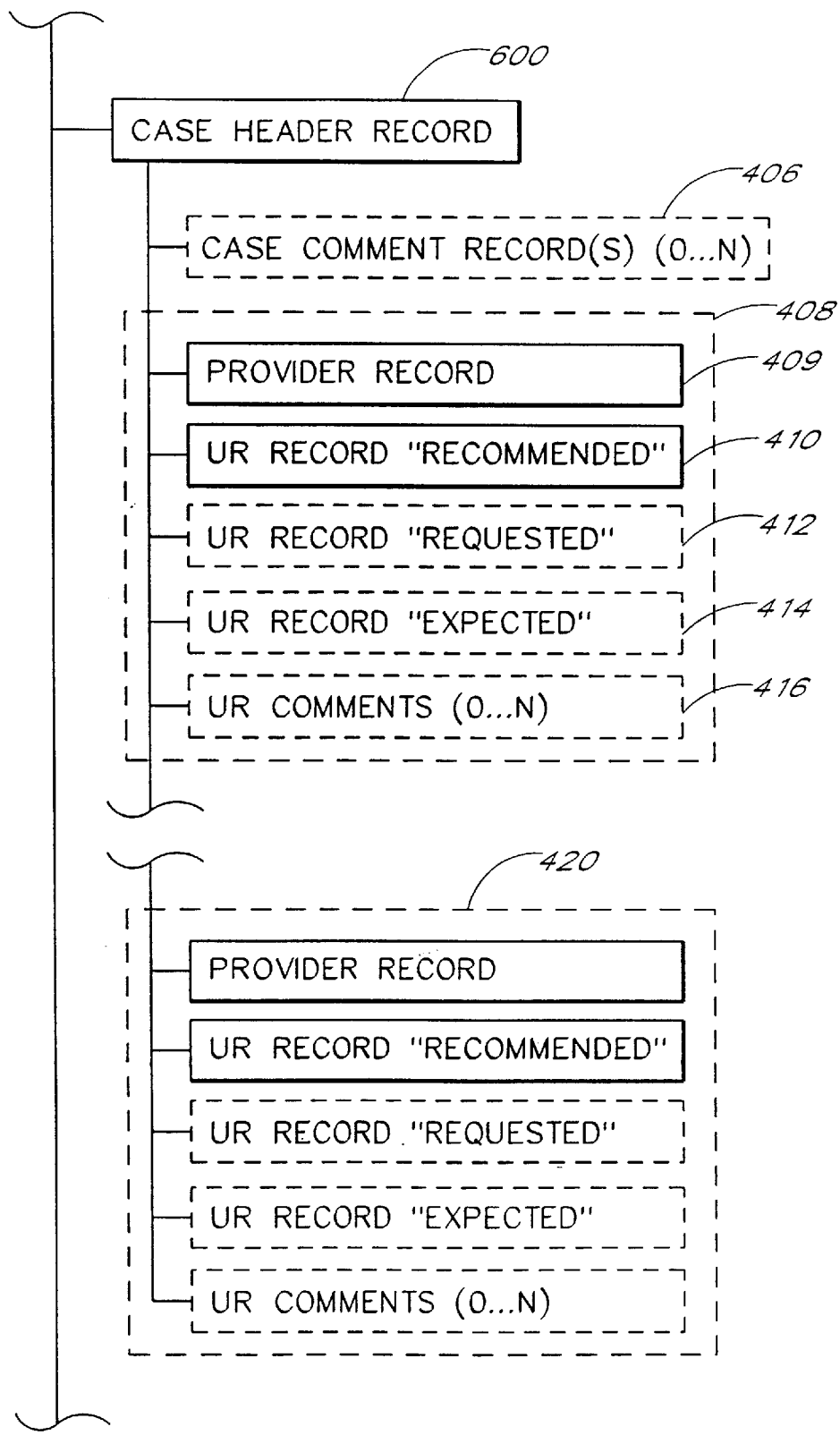
FIG. 4 is a hierarchy chart illustrating the relationships among the various records in the UR database.

FIG. 4 shows a hierarchy of record types found the UR database 122. Recall that each claim 103 may result in one or more cases 130. Each case 130 is associated with a single case header record 600. Each case header record may optionally be associated with one or more case comment records 406. Each case header record is associated with one or more UR record groups 408, where each UR record group represents a single UR agreement 107. Each UR record group 408 comprises a single provider record 700. Each UR record group 408 further comprises from one to three UR records 800. The first, and required, of the three UR records 800 is a recommended treatment record 410. The recommended treatment record 410 contains data pertaining to the treatment actually authorized under the UR agreement 107. The UR record group 408 optionally comprises one or more UR comment records 416. The second UR record 800 in the UR record group 408 is a requested treatment record 412. The requested treatment record 412 contains data pertaining to the treatment requested by the provider. The third UR record 800 in the UR record group 408 is an expected treatment record 414. The expected treatment record 416 contains data pertaining to an expected treatment. The requested treatment record 412 and the expected treatment record 416 are optional.

FIG. 5 shows the various data fields of a bill line record 500. Each line 110 of a medical bill 109 is represented by a single bill line record 500 in the bill database 120. A claim number field 501 contains an identifier for the claim 103. A date of service field 502 contains a date of treatment. A procedure code field 503 contains a code which identifies a medical treatment. A cost field 504 contains an amount that the provider 104 expects to be paid. A procedure code modifier field 505 contains a value used in conjunction with the procedure code 503 when searching the UR database 122 for UR agreements 107 which correspond to the bill line record 500. A rule level field 5065 and a rule sequence number field 507 contain data which identify a, state, PPO, payor specific or generic rule that applies to the procedure code 503. A BindFlag field 508 flags whether or not the rule specified by the rule level field 506 and the rule sequence number field 507 is binding. A MandFlag field 509 flags whether or not the rule specified by the rule level field 506 and the rule sequence number field 507 is mandatory.

FIG. 6 shows various data fields of the case header record 600. A case ID field 602 contains a UR vendor case ID which references the UR vendor's identification of a pre-authorization request 105. The UR vendor case ID field 602 is a link from a; UR vendor's case record to a bill review system's case record. Subsequent submissions of records containing the same UR vendor case ID 602 as an existing case header record 600 indicate an update to the existing record. A claim number field 603 contains a payor's 106 (i.e. an insurance carrier's) claim number. A field 604 contains the worker's 101 social security number. The claim number field 603 is used to verify that a claim number is correct and can be used to match a case header record 600 to a claim number if a claim is not found. A name field 606 contains the name of the worker 101. An address field 609 contains the address of the worker 101. The name field 606 and address field 609 can be used to help match the case header record 600 to a claim number 603 if a claim is not found. A field 613 contains the date of the injury 102 to the worker 101. A UR vendor cost field 614 contains a fee that the UR vendor is charging a payor 106 to manage the case 130 and enforce the LUR agreements 107. A UR request date field 615 contains a date that the UR company received a pre-treatment authorization request 105 from a provider 104. A UR request type field 616 contains a code indicating a service being performed by the UR vendor. Under the preferred embodiment, the UR request type field 616 always contains a character string "UM" to indicate that utilization management is being performed. A primary diagnosis field 617 contains a primary diagnosis code for the injury 102 suffered by the worker 101. A secondary diagnosis field 616 contains a secondary diagnosis codes. A group of fields 619, 620 and 621 contain subsequent diagnosis codes. A status field 622 contains a current status of the case 103. The current status field 622 always contains a code indicating one of the following values: "open", "close", "canceled", or "deleted." A PPO identifier field 623 contains a code which identifies which PPO the claimant 101 is to be using.

FIG. 7 shows the fields of a provider record 700. A UR vendor review ID field 702 contains a UR vendor supplied code which identifies a specific UR agreement. A provider type field 703 indicates a type of provider described in the provider record 700. A "P" in the provider type field 703 indicates that the provider record 700 describes a primary care physician. A "T" in the type field 703 indicates that the provider record 700 describes a treating provider. A TIN field 704 contains an IRS identification number for the provider 104 A provider name field 706 contains the name of the provider 107. A facility name field 706 contains the name of a treating facility where medical services 108 will be rendered by the provider 104. A provider address field 708 contains the provider's 104 business address and phone number. A billing address field 715 contains the provider's 104 billing address and phone number.

FIG. 8 shows the fields of a UR record 800. A UR vendor case ID field 802 is used to link the UR record 800 to a specific case 130. A UR vendor review ID field 8,03 a unique identifier used to identify a specific UR agreement 107. Submissions of UR records 800 to the UR database 122 which have the same UR vendor review ID 803 as an existing UR record 800 indicate an update to the existing record. A starting date field 805 contains a starting date for treatment. An ending date field 806 contains an ending date of treatment. A first procedure code field 808 contains a lowest value in a range of procedure codes. A second procedure code field 809 contains a highest value in a range of procedure codes. A first modifier code field 808 contains a procedure code modifier for the first procedure code field 809. A second modifier code field 809 contains a procedure code modifier for the second procedure code field 909. A client type field 812 contains a code that indicates what type of service is to be performed. A place of service field 813 contains the address of a location where treatment will be provided. A treatment area field 814 contains a code indicating either "right", "left", or "bilateral." A quantity field 815 contains a quantity of treatments to be performed. An activity type field 816 contains a code indicating either sessions (for physical medicine only) procedure, or other (e.g. anything without a specific procedure code). A frequency field 817 contains a code indicating a frequency of treatment as either per day, per week, per month, per year, or maximum. A PPO ID field 818 contains a code identifying the provider 104 as a member of a specified PPO. A reason field 819 contains a client specific reason code. A UR action field 820 contains a code indicating what action was taken as part of the UR agreement. In the preferred embodiment, the UR action field 820 is a code indicating one of the following: "treatment plan clarified/authorized"; "negotiated a change in the treatment plan"; "moved to out-patient treatment"; "avoided procedure requested"; "negotiated a change in time lost"; "unsuccessful negotiation"; or "medical information given." A nurse's results field 821 indicates whether a nurse advisor negotiated the UR agreement 107. A physician advisor request date field 822 contains a date indicating when a physician advisor was requested by the provider 104. A description field 824 contains a description of a treatment authorization. A fee discount schedule field. 825 contains a discount fee schedule negotiated with the provider 104. A flat rate field 826 contains a flat dollar amount negotiated for a service with the provider 104. A UR vendor review cost field 827 contains a fee that a UR company charges a payor 1065 for performing UR services. A date of request field 832 contains a date that the provider 104 made the pre-treatment authorization request 105. A status field 833 contains a code indicating a current status of the UR review 107. The status field 833 contains a code indicating either "open", "closed", "canceled", or "deleted." A UR request type field 834 contains a code indicating a type of UR review being performed, indicating either "initial", "appeal", "re-review", or "concurrent review."

Figure 9:
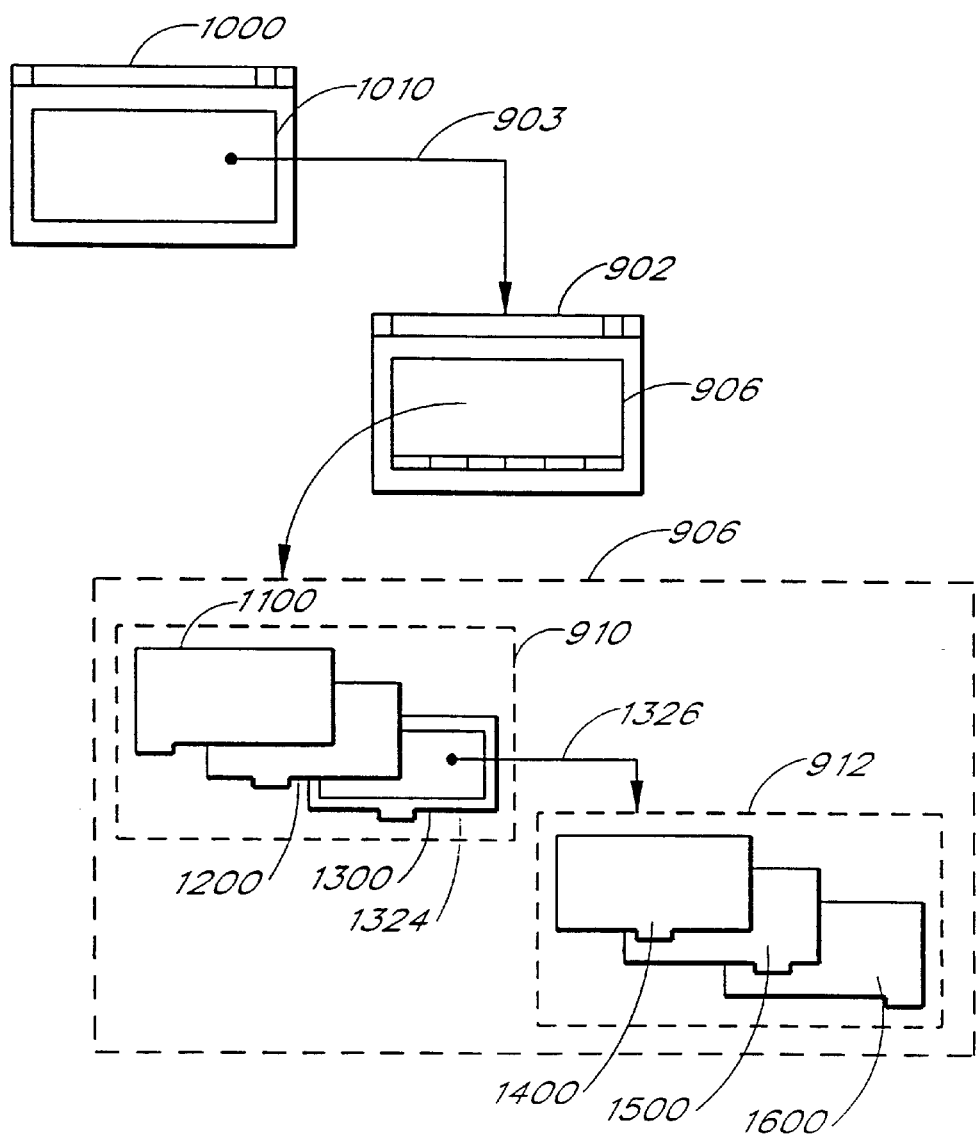
FIG. 9 illustrates the relationships among the various dialog pages used in one embodiment of a user interface.

FIG. 9 shows an overview of a preferred embodiment of a graphical user interface (GUI) for allowing a user, either the payor 106 or the UR vendor, to manipulate data associated with the claim 103 and the UR agreements 107. A case selection dialog 1000 comprises a list of cases 1010. The list of cases 1010 includes all of the cases 130 associated with any particular claim 103. Each line in the list of cases 1010 is associated with a managed care entry dialog 902. The managed care entry dialog 902 comprises a collection of dialog pages 906 where each dialog page in the collection 906 allows the user to enter and manipulate various aspects of the data related to a selected case 130 or a selected UR agreement 107. Selection of a case in the list of cases 1010 causes fields of the dialog pages 906 to be initialized from the UR database 122. The sequence of dialog pages 906 can be conveniently broken up into two logical groupings. A first logical grouping of pages 910 comprises a case header dialog page 1100, a case comments dialog page 1200 and a reviews dialog page 1300. The first logical grouping 910 contain pages that all relate to a specific case 130. A second grouping of dialog pages 912 contains a review header dialog page 1400, a review details dialog page 1500, and a review comments dialog page 1600. The second grouping of pages 912 contains pages that relate to a specific UR agreement 107 selected by a reviews listbox 1324 in the reviews dialog page 1300. The case header dialog page 1100 allows the user to enter claim information and case header information. The case comments dialog page 1200 allows the user to enter comments relating to the case 130 selected in the list of cases 1010. The reviews dialog page 1300 allows the user to select a UR agreement. The reviews dialog page 1300 comprises a reviews listbox 1324 which lists all of the UR agreements 107 associated with the selected case. Selection of a line in the reviews listbox 1324 selects a UR agreement and causes the fields of the dialog pages in the second logical grouping 912 to be initialized with the data from the UR database 122 that corresponds to the selected UR agreement. The review header dialog page 1400 allows the user to edit a subset of the fields from a review header. A review header is defined as the set of fields in the recommended treatment record 410, the requested treatment record 412 and the expected treatment record 414 that contain identical values. The review details dialog page 1500 allows the user to enter and manipulate data associated with a medical treatment. The review comments dialog page 1600 allows the user to enter and manipulate comments associated with the selected UR agreement The appearance and fields of the review comments dialog page 1600 are substantially similar to the case comments dialog page 1200.

Figure 10:
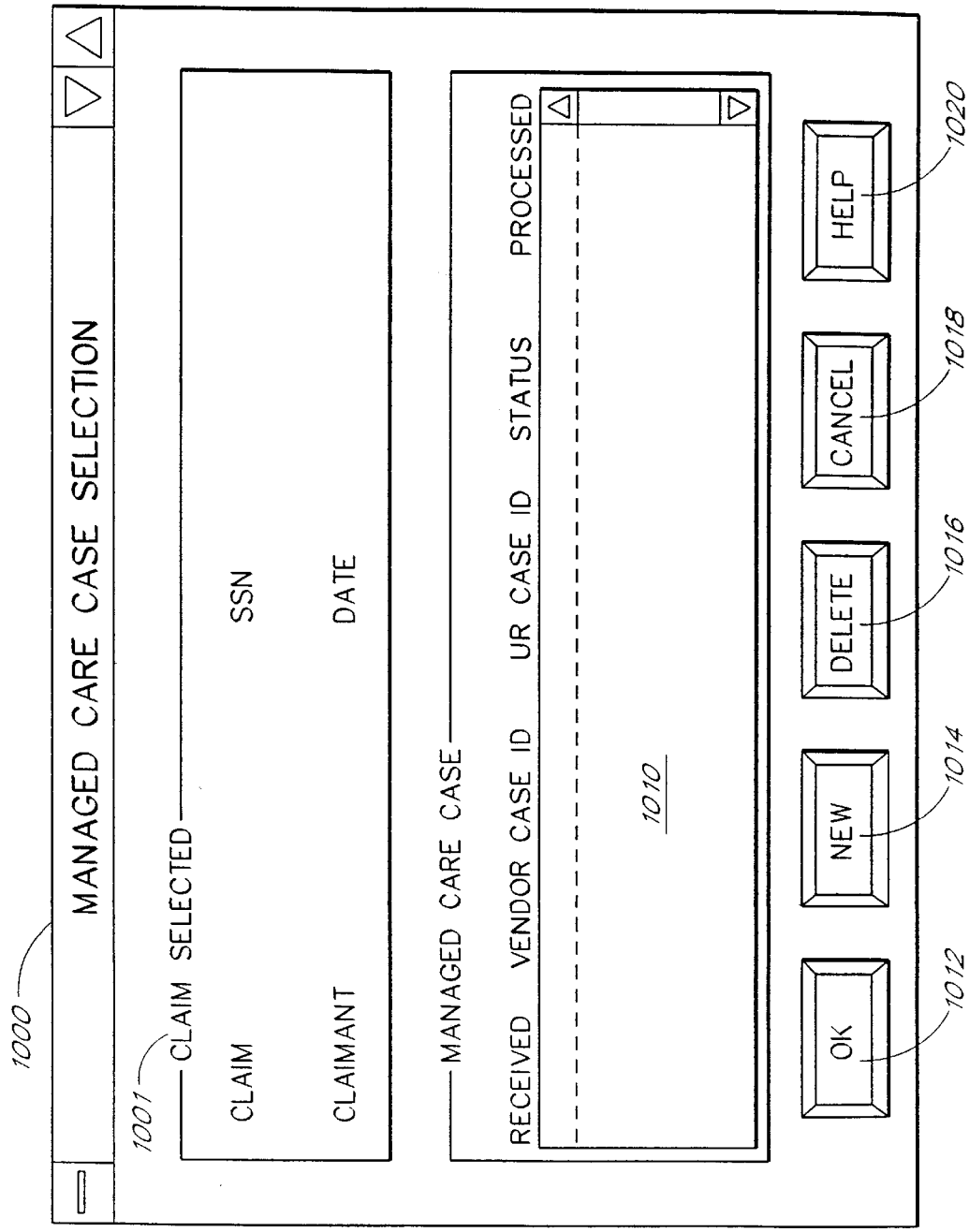
FIG. 10 illustrates one embodiment of a managed care case selection dialog.

FIG. 10 shows a preferred layout of the case selection dialog page 1000. The case selection dialog page 1000 displays a claim selected grouping of static fields 1001 which comprise the claim number, the claimant name, the claimant social security number, and the date of injury. A claim 103 can have one or more managed care Cases 130 relating to that claim 103. The claim selection dialog page 1000 contains a cases listbox 1010 which lists all managed care cases relating to a claim 103. Each line in the cases listbox 1010 corresponds to a single case. Each line in the cases listbox 1010 shows various fields from the case header record 600, including, the date of the UR request 615, the UR vendors case ID 602, the UR review ID 702, the case status 622, and a date the case 130 was processed. A case listed in the cases listbox 1010 can be edited either by double clicking that case in the list 1010 or by selecting a line in the cases listbox 101 and pressing an okay button 1012. The case selection dialog 1000 also contains a new button 1014 for creating a new case, a delete button 1016 for deleting the currently selected case, and a cancel button 1013 for canceling the dialog 1000 without further action. Finally, the case selection dialog 1000 also comprises a help button 1020 to call up an online help file.

Figure 11:
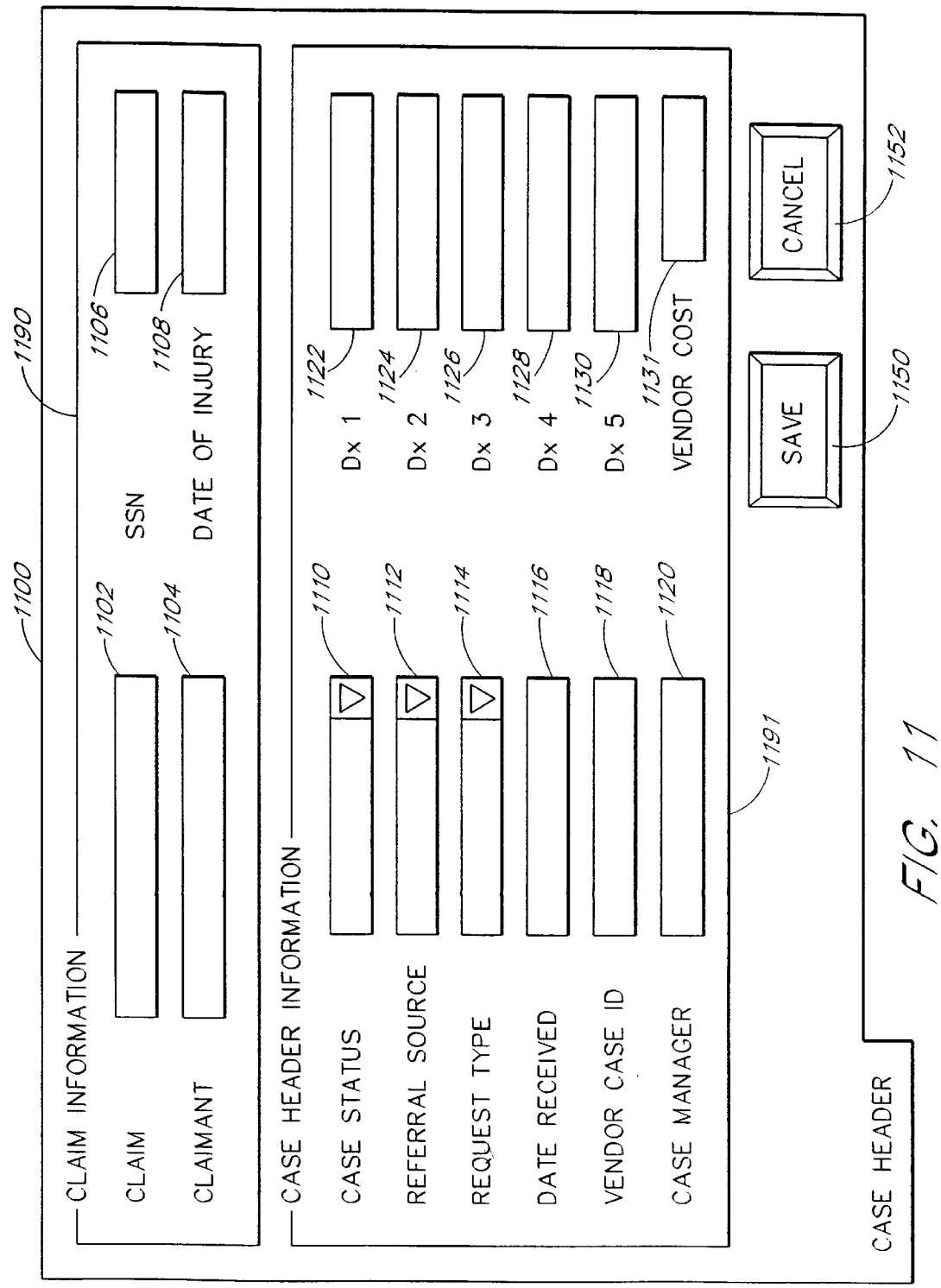
FIG. 11 illustrates one embodiment of a case header dialog page.
Figure 12:
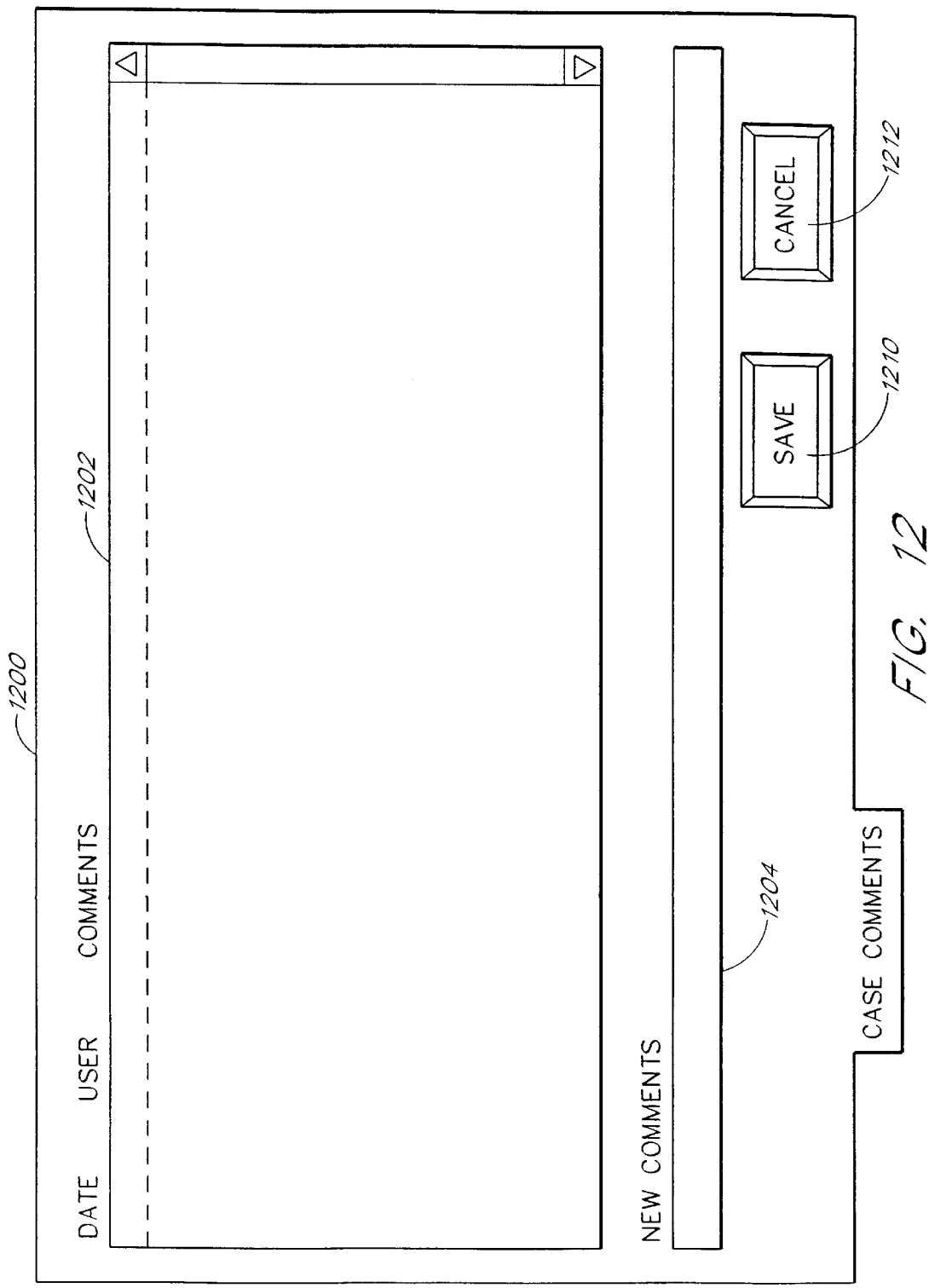
FIG. 12 illustrates one embodiment of a case comments dialog page.
Figure 13:
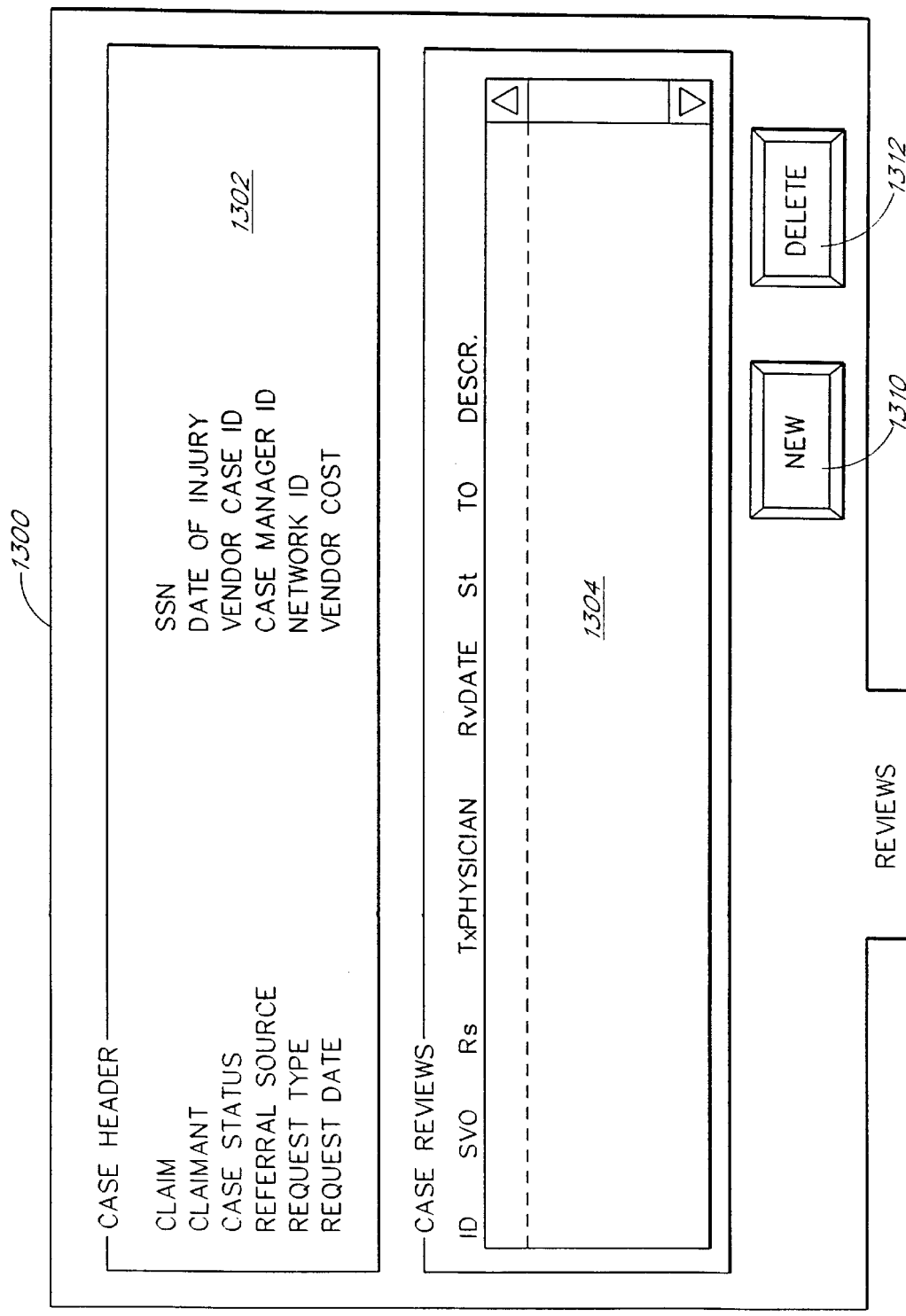
FIG. 13 illustrates one embodiment of a dialog page for manipulating a list of UR agreements.

FIG. 11 shows a preferred embodiment of the case header dialog page 1100 which is part of the dialog box 902. The case header dialog page 1100 contains an edit box 1102 for editing the claim number stored in the carrier claim number field 603. The dialog box 1100 further comprises an edit box 1104 for editing the name of the worker 101 stored in the claimant name field 606, an edit box 1106 for entering a social security number into the social security number field 604, and an edit box 1108 for entering the date of injury into the date of injury field 613. The dialog page 1100 also comprises a case status select box 1110 which shows the contents of the open status field 622. In the preferred embodiment, the case status select box 1110 shows either "open", "closed", "canceled", or "deleted." The case header dialog page 1100 also comprises a referral source select box 1112. In a preferred embodiment, legitimate values for the referral source select box are: "first report of injury"; "hard copy authorization letter"; "authorization"; "claims adjuster"; and "referral request". Each case 130 may have a different source than its subsequent UR agreements 107. The case header dialog page 1100 also comprises a request type select box 1114 for manipulating the UR request type field 616. In a preferred embodiment, valid request types for the request type select box 1114 are limited to utilization management (UM) but other embodiments could include other requests types such as audits and case management. The case header dialog page 1100 also comprises a request received date editbox 1116 for editing the date of the UR request field 15. A vendor case ID editbox 1120 allows the user to edit the UR vendor case id field 602. A case manager ID editbox contains a name or identification code of a person managing the case. This person will generally be a nurse case manager. A series of edit boxes 1122, 1124, 1126, 1123, 1130 contain diagnosis codes corresponding to the diagnosis fields 617, 618, 619, 620 and 621 respectively. In a preferred embodiment, the diagnosis codes are AMA IDC-14 codes. A vendor cost editbox 1132 allows the user to edit the UR vendor case cost field 614. Finally, the case header dialog page 1100 comprises a Save button 1150 and a Cancel button 1152 to perform the usual save and cancel functions.

The case comments dialog page 1200 comprises a list of case comments 1202 and a new comment editbox 1204 for entering new comments. The case comments dialog page also comprises a Save button 1150 and a Cancel button 1152 to perform the usual save and cancel functions.

The reviews dialog page 1300 comprises a group of static fields called a case header group 1302. The case header group 1302 comprises static fields that show the data stored in the claim number field 603, the claimant name field 602, the social security number field 604, the date of injury field 613, the case status field 622, the request type 616, the request receive date 615, the vendor case ID 602, the network ID 623, and the vendor costs 614. The reviews dialog page 1300 also comprises a reviews listbox 1304 which lists all of the UR agreements 107 relating to the case 130. Each entry in the review listbox 1324 comprises a text string showing a review ID (a combination of the case ID field 802 and the review ID field 803) and data from the UR review record, including, the type of service field 816, the review result field 821, the provider name field 706, the date of review field 831, the status field 833, the beginning date field 805, the ending date field 806, and the description field 824. The reviews dialog page 1300 also comprises a, New button 1334 for creating a new utilization review entry in the list 1324 and a Delete button 1336 for deleting an entry from the list A priority field displays a "Y" if there are important notes or comments to be read otherwise an "N" is displayed. To enter a new UR agreement 107 into the UR database 122, the user first creates a new UR record 800 by pressing the New button 1334. Pushing this button opens the review header page 1400.

Figure 14:
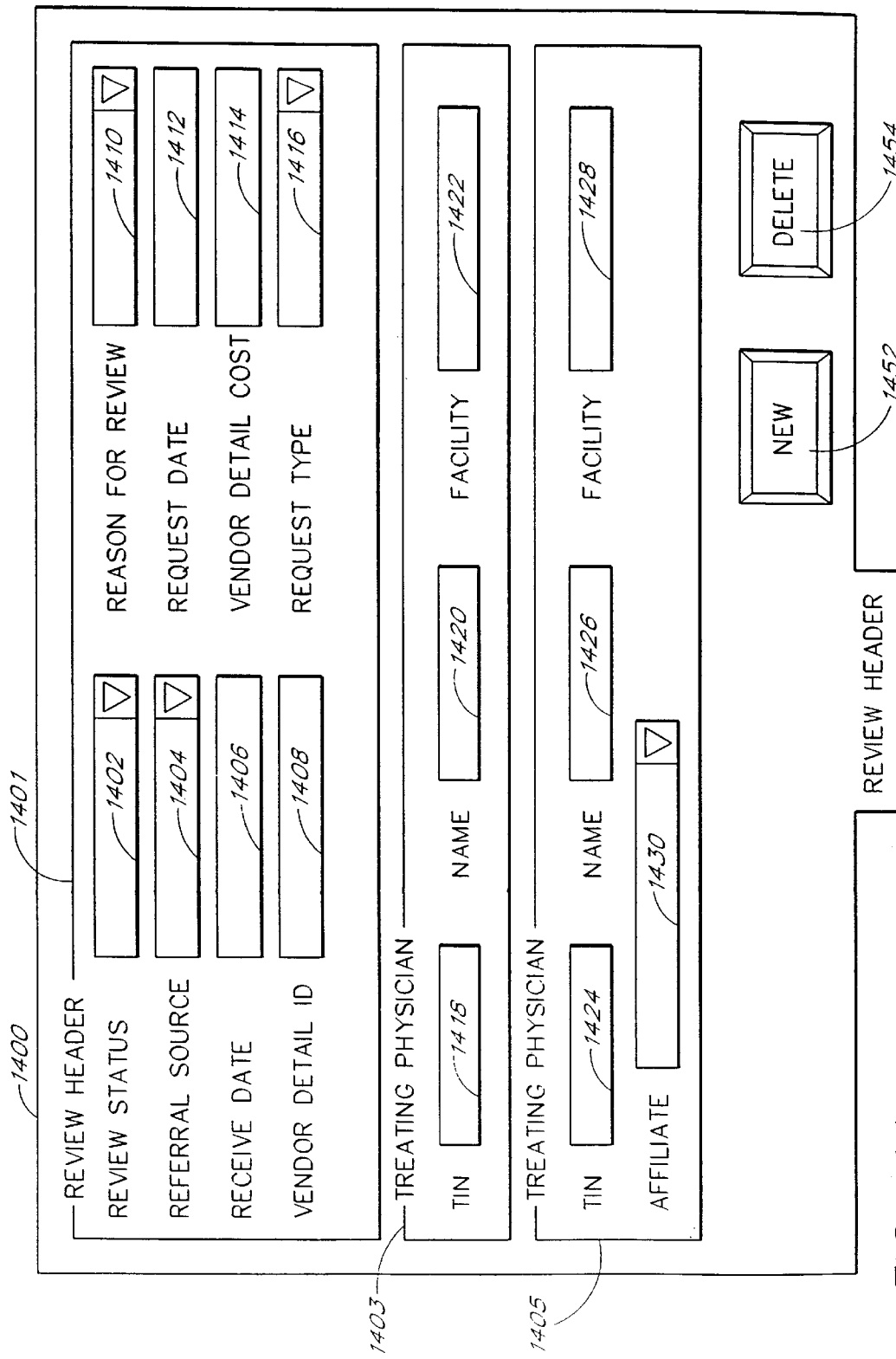
FIG. 14 illustrates one embodiment of a dialog page for manipulating a UR header.

FIG. 14 shows the fields of the review header dialog page 1400. The review header dialog page 1400 comprises a review status select box 1402 for manipulating the review status 833, a referral source select box 1404 for entering a referral source, a receive date editbox 1406, and a vendor detail ID editbox 1408 for editing the UR vendor review ID field 803. The receive date editbox 1406 allows the user to edit the authorization request date field 832. If no date is entered, the system defaults to the current date. The vendor detail ID field 1408 is an optional field that contains a unique identifier assigned by the UR vendor. The review header dialog page 1400 also comprises a reason select box 1410, a request date editbox 1412, a vendor detail cost editbox 1414, and a request type select box 1416. The reason select box 1410 allows the user to edit the reason for UR field 819. A payor 106 will receive processed reviews for a variety of reasons, such as, to clarify treatment, to provide information, and to obtain a pre-authorization. The request date field 1412 allows the user to edit the request date field 832, in month, date, year format. This date reflects the date the requesters ask for a review. This date is not necessarily the date the request was received. For example, if the request was made in a letter, the date on the letter would be the request date. If the request was made by telephone, the date the call was received would be the request date. If no date is entered for field 1412, the system defaults to the current date. The vendor detail costs edit box 1414 allows the user to enter the UR vendor review cost field 827 which contains the amount that the client's managed care vendor may charge the payor 106 for managed, care billing review services. The UR vendor review cost field 827 can be entered as flat rate per review. The request type select box 1416 allows the user to manipulate the UTR request type field 834. In the preferred embodiment, the request type select box shows either "perspective", "retrospective", or "ongoing concurrent with treatment." The dialog page 1400 also comprises a tax identification number edit box 1413 for editing the TIN field 704. The provider name field 706 is edited using a physician edit box 1420 and a the primary care facility name field 707 is edited using the facility name edit box 1422 The dialog page 1400 comprises a Save button 1452 and a Cancel button 1454 to perform the usual save and cancel functions.

Figure 15:
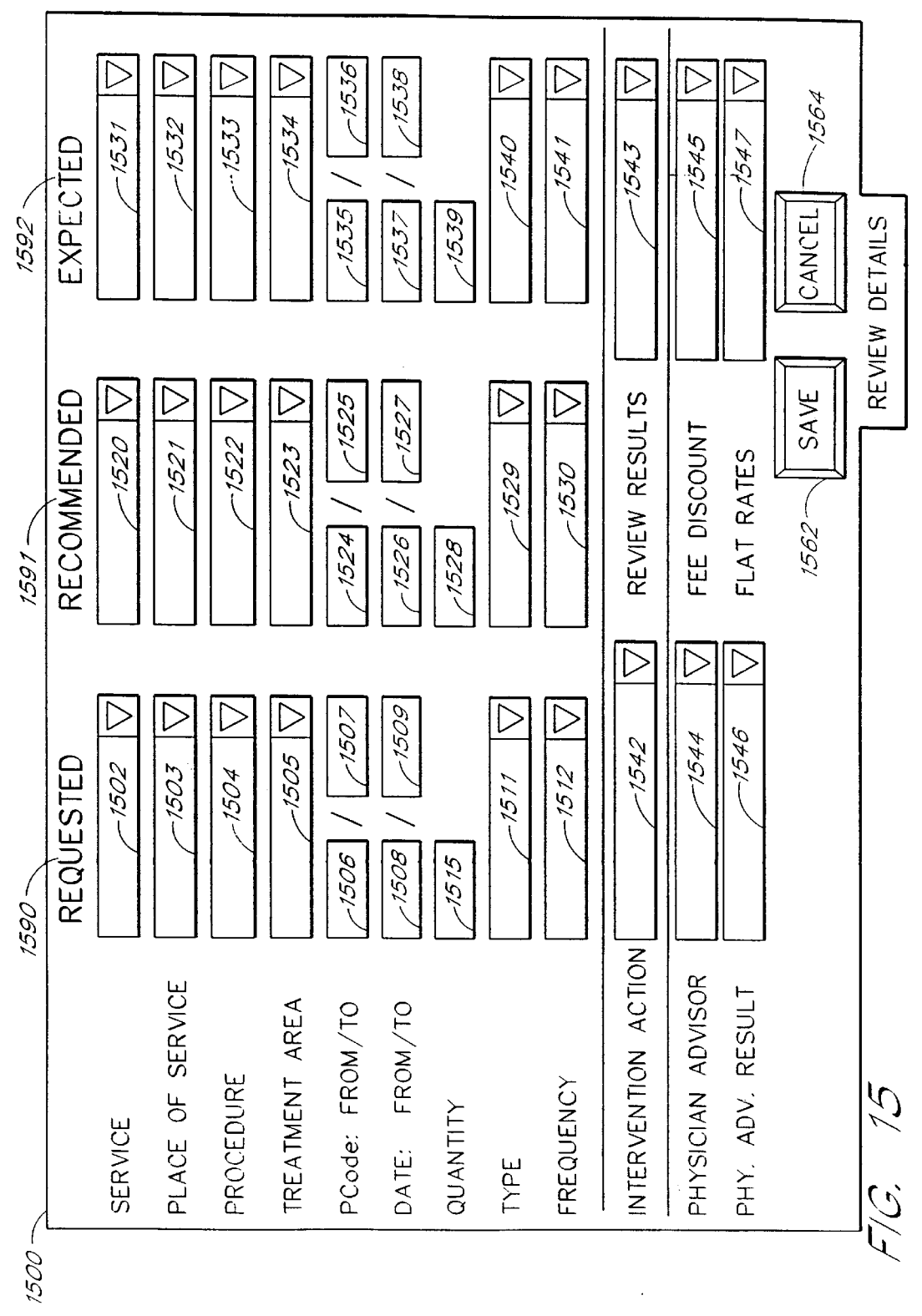

FIG. 15 shows the review details dialog page 1500. The review details dialog page 1500 comprises three groups of entries corresponding to a requested treatment group 1590, a recommended treatment group 1591 and an expected treatment group 1592. Dialog controls grouped under the requested treatment group 1590 allow the user to edit various fields of the requested UR record 412. Dialog controls grouped under the recommended treatment group 1591 allow the user to edit various fields of the recommended UR record 410. Dialog controls grouped under the expected treatment group 1592 allow the user to edit various fields of the expected UR record 414. As stated previously, the requested UR record 412, the recommended UR record 410, and the expected UR record 414 are all UR records 800. The type of UR record field 804 of a specific UR record 800 specifies whether that UR record 800 is a requested UR record 412, a recommended UR record 410, or an expected UR record 414.

The requested treatment group 1590 comprises a requested service select box 1502, a requested place of service select box 1503, a requested procedure description select box 1504, and a requested treatment area select box 1505. The dialog page 1500 also comprises a requested first procedure code editbox 1506 for entering a requested starting procedure code. The first requested procedure code editbox 1506 has two sub-fields, one for editing the first procedure code field 808 and one for editing the first UR modifier field 810. The dialog page 1500 also comprises a second requested procedure code editbox 1507. The second requested procedure code editbox 1507 has two sub-fields, one for editing the second procedure code field 809 and one for editing the second UR modifier field 811. A requested starting date editbox 1508 is provided for editing the starting date field 805 and an requested ending date editbox 1509 is provided for editing the ending date field 809. A requested quantity editbox 1515 is provided for editing the quantity field 815. A requested type of treatment select box 1511 is provided for manipulating the activity type field 816. A frequency of treatment select box 1512 is provided for manipulating the frequency of treatment field 817.

The recommended treatment group 1591 comprises a recommended service select box 1520, a recommended place of service select box 1521, a recommended procedure description select box 1522, and a recommended treatment area select box 1523. The dialog page 1500 also comprises a recommended first procedure code editbox 1524 for entering a recommended starting procedure code. The first recommended procedure code editbox 1524 has two sub-fields, one for editing the first procedure code field 808 and one for editing the first UR modifier field 810. The dialog page 1500 also comprises a second recommended procedure code editbox 1525. The second recommended procedure code editbox 1525 has two sub-fields, one for editing the second procedure code field 809 and one for editing the second UR modifier field 811. A recommended starting date editbox 1526 is provided for editing the starting date field 805 and a recommended ending date editbox 1527 is provided for editing the ending date field 809. A quantity editbox 152.8 is provided for editing the quantity field 815. A recommended type of treatment select box 1529 is provided for manipulating the activity type field 816. A recommended frequency of treatment select box 1530 is provided for manipulating the frequency of treatment field 817.

The expected treatment group 1592 comprises an expected service select box 1531, an expected place of service select box 1532, an expected procedure description select box 1533, and an expected treatment area select box 1534. The dialog page 1500 also comprises an expected first procedure code editbox 1535 for entering an expected starting procedure code. The first expected procedure code editbox 1535 has two sub-fields, one for editing the first procedure code field 808 and one for editing the first UR modifier field 810. The dialog page 1500 also comprises a second expected procedure code editbox 1536. The second expected procedure code editbox 1536 has two sub-fields, one for editing the second procedure code field 809 and one for editing the second UR modifier field 811. An expected starting date editbox 1537 is provided for editing the starting date field 805 and an expected ending date editbox 1538 is provided for editing the ending date field 809. An expected quantity editbox 1539 is provided for editing the quantity field 815. A type of treatment select box 1540 is provided for manipulating the activity type field 816. An expected frequency of treatment select box 1541 is provided for manipulating the frequency of treatment field 817.

Also, in the dialog page 1500 an intervention action select box 1542 is provided to manipulate the UR action field 820. A review results field 1543 is provided for manipulating the UR nurse's results field 821. A physician advisor select box 15i44 is provided for selecting a physician advisor. A physician advisor results select box 1546 is provided for manipulating the physician advisor results field 823. A fee discount select box 1545 is provided for entering the fee schedule discount field 825. A flat rate select box 1547 is provided for editing the flat rate field 826. The flat rate field 826 can be used with the quantity field 815 to determined an allowable fee. A save button 1562 and a cancel button 1564 are provided to permit the usual save and cancel functions.

Figure 16:
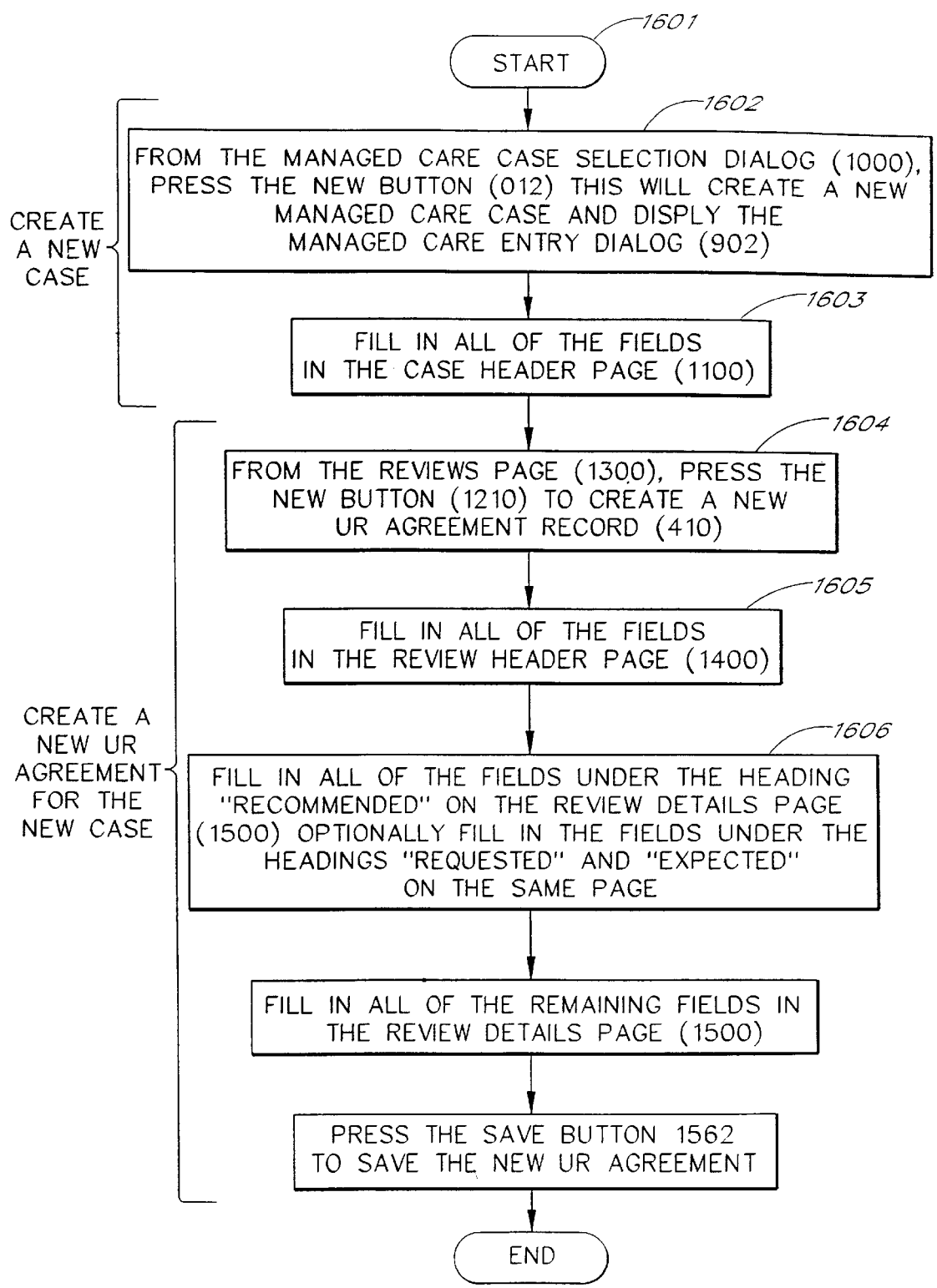
FIG. 16 is a flowchart showing the steps used to create a new case and a new UR agreement.

FIG. 16 is a flowchart showing the steps used to enter a new case 130 and a new UR agreement 107 into the UR database 122. The flowchart starts at a process block 1602. In the process block 1602 the user presses the New button 1012 in the case selection dialog 1000. Pressing the New button 1012 causes the Managed Care Entry dialog 902 to be displayed. The process then proceeds to a process block 1603 wherein the user fills in the fields of the Case Header dialog page 1100. At the completion of the process block 1603 a new case has been created whereupon the process proceeds to a process block 1604. In the process block 1604 the user selects the Reviews dialog page and presses the New button 1210 to create a new UR agreement record 410. Processing then proceeds to a process block 1605 wherein the user fills in all uninitialized fields in the Review header page 1400. Processing then proceeds to a process block 1606 wherein the user selects the Review Details dialog page 1500. Also in the process block 1606 the user fills in the fields under the REQUESTED treatment group 1590, and optionally fills in the fields under the RECOMMENDED treatment group 1591 and/or the fields under the EXPECTED treatment group 1592. Initializing any fields under the RECOMMENDED treatment group 1591 will cause the creation of a recommended treatment record 412. Initializing any fields under the EXPECTED treatment group 1592 will cause the creation of an expected treatment record 412. Upon completion of process block 1606, processing continues to a process block 1608 where the user fills in other fields in the Review Details dialog page 1500 as desired. Processing then proceeds to a final process block 1608 wherein the user presses the Save button 1562 to save the data in the UR database 122. The user can repeat process blocks 1604, 1605, 1606, 1607 and 1608 to enter as many new UR agreements 107 as necessary.

In a preferred embodiment, all of the process steps shown in FIG. 16 are generally performed, however, the process steps need not be performed exactly in the same order as shown in the flowchart. One skilled in the art will recognize that the software can be written such that the user is able to move around between the various dialog pages 906 in a more or less random fashion.

Figure 17:
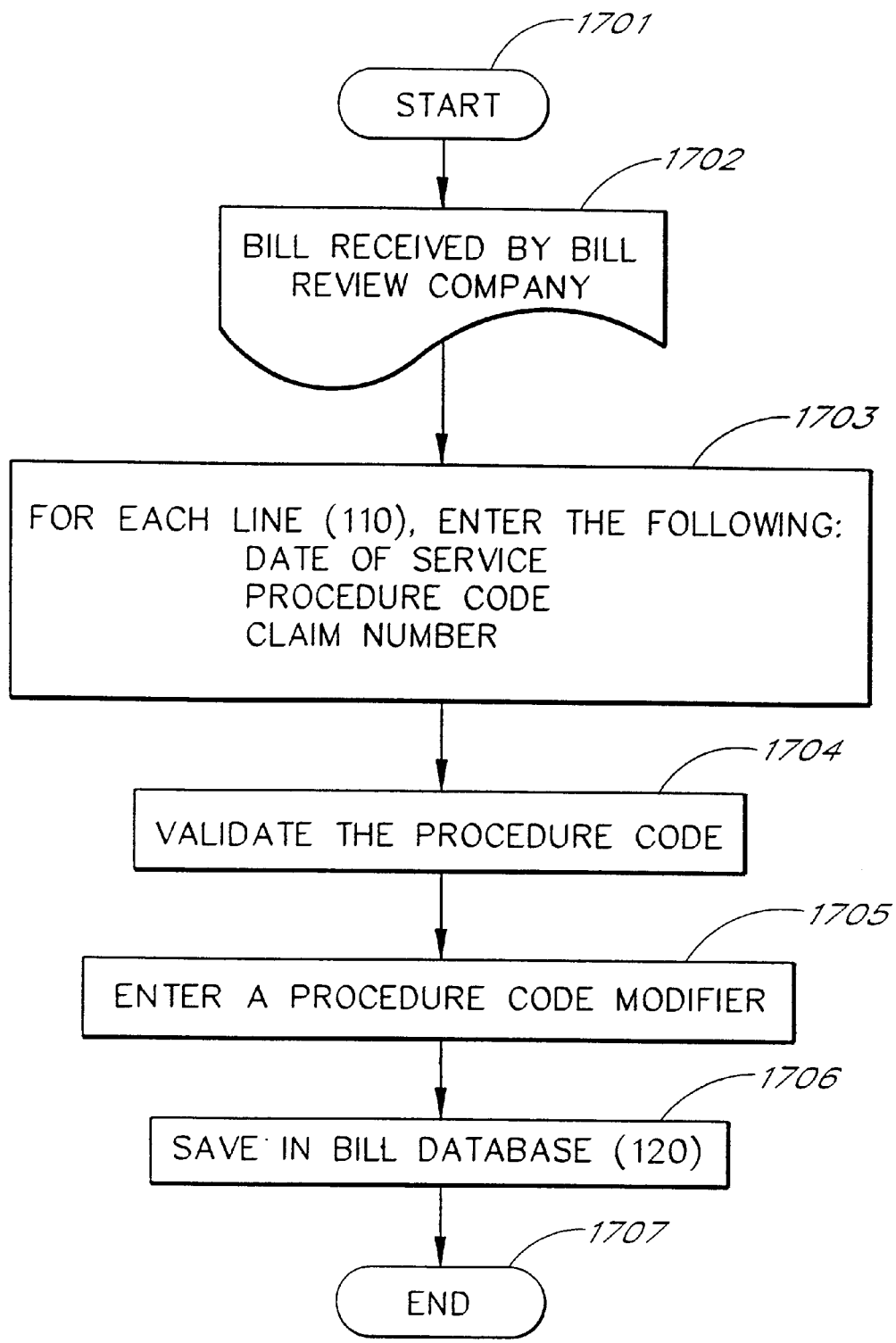
FIG. 17 is a flowchart showing the steps necessary to enter a bill into a bill database.

FIG. 17 is a flowchart showing the steps used to enter a line 110 from a medical bill 109 into a bill record 500 in the bill database 120. The process starts at a process block 1702 where the bill is received by the bill review vendor. Processing then proceeds to a process block 1703 where an operator enters the date of service 502, the procedure code 503, and claim number 501 from each line 110 of the bill 109. Processing then proceeds to a process block 1704 where the procedure code 503 is validated. Processing then proceeds to a process block 1705 where the operator enters the procedure ode modifier 505. Processing then proceeds to a final process block 1706 where the record 500 is entered into the bill database 120

Figure 18B:
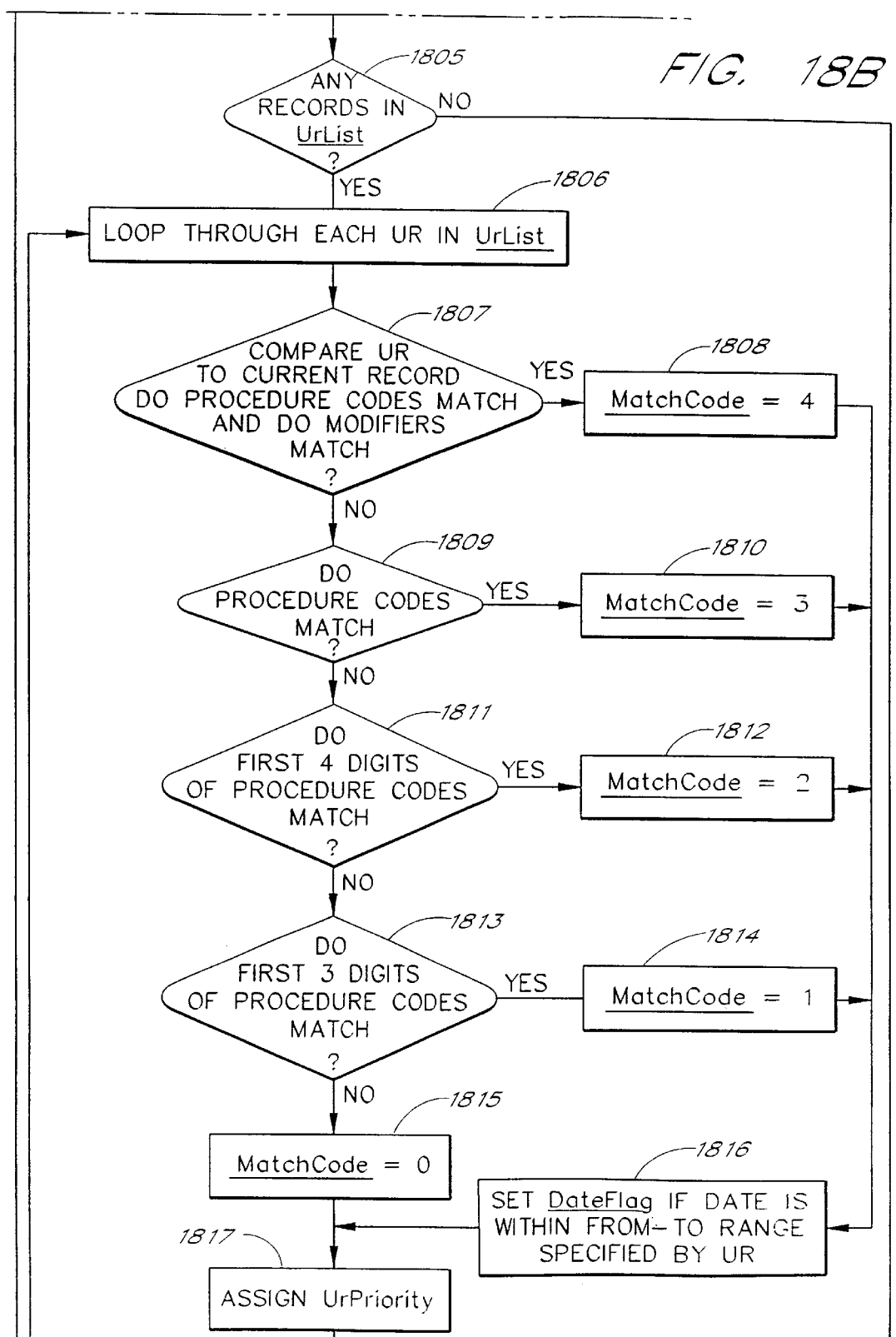
FIG. 18, consisting of FIGS. 18A–18D, is a series of flowcharts detailing the steps used to correlate entries in a bill database and entries in a UR agreement database.
Figure 18C:
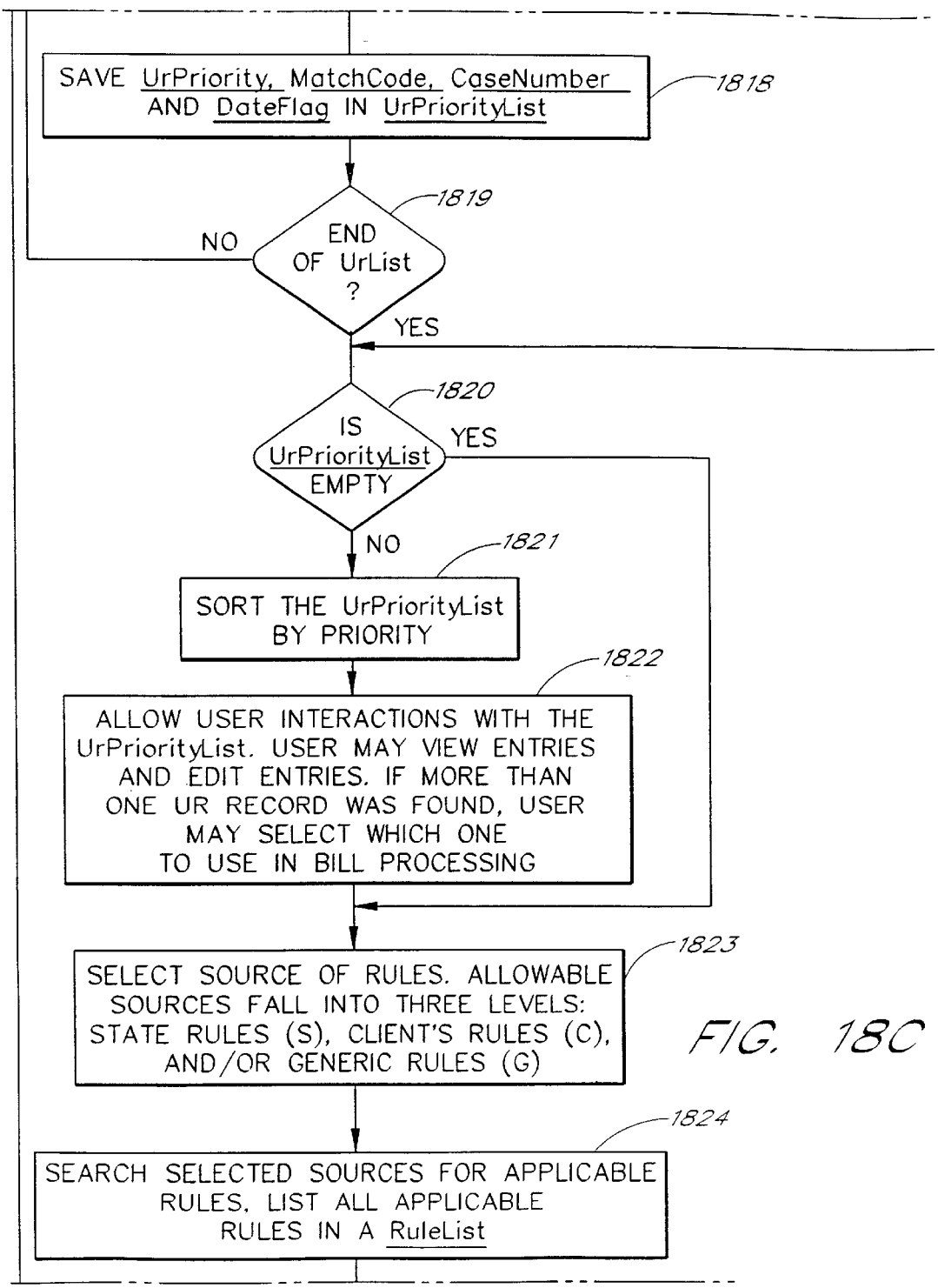
Figure 18D:
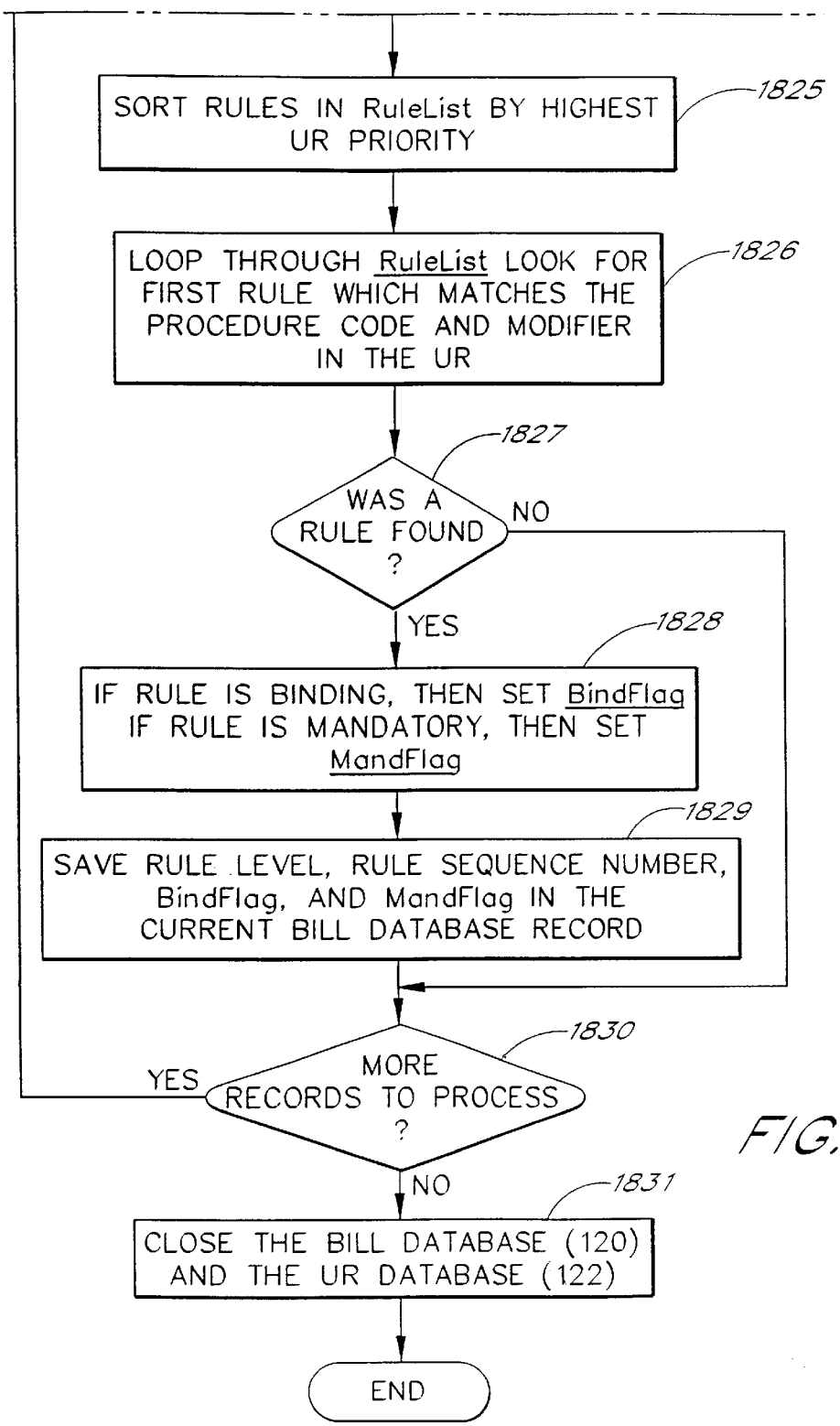

FIG. 18 shows a series of flowcharts detailing the steps used to correlate records 500 in a bill database 120 and UR agreements 107 stored in a UR database 122. Processing begins at a process block 1801 where the bill database 120 is opened. Processing then proceeds to a process block 1802 where the UR database 122 is opened. Once the UR database is open, processing proceeds to a process block 1803. in the process block 1803 a current record is selected from the bill database 120. The current record is a bill record 500. The claim number field 501 of the current record identifies a current claim. Processing then proceeds to a step 1804 where the entire UR databases 122 is searched for UR agreements 107 which reference the current claim. All of the UR agreements 107 which reference the current claim are placed in a list, UrList. Processing then proceeds to a decision block 1805 which determines if there are any elements in the UrList. If there are no elements in the UrList, then there are no UR agreements 107 related to the current claim and processing jumps ahead to a decision block 1820. If, on the other hand, there are elements in the UrList, then processing proceeds to a loop control block 1806 which selects a current UR agreement 107 from the UrList.

Processing then proceeds to a decision block 1807 which compares the procedure code 503 in the current record with a procedure code range in the current UR agreement and also compares the procedure code modifier 505 in the current record with a procedure code modifier range in the current UR agreement. If the procedure code 503 in the current record matches the procedure code range in the current UR agreement and the procedure code modifier 505 in the current record matches the procedure code modifier range in the current UR agreement then processing proceeds to a process block 1808 where a MatchCode is set to a numeric of value 4 to indicate that a very high correlation exists between the current record and the current UR agreement. Processing then jumps to a process block 1816. Returning to the decision block 1807, if the procedure code 503 in the current record does not match the procedure code range in the current UR agreement or the procedure code modifier 505 in the current record does not match the procedure code modifier range in the current UR agreement, then processing proceeds to a decision block 1809 for further correlation testing.

In the process block 1809, the procedure code 503 in the current record is compared with the procedure code range in the current UR agreement. If the procedure code 503 in the current record matches the procedure code range in the current UR agreement then processing proceeds to a process block 1810 where the MatchCode is set to a numeric of value 3 to indicate that a high correlation exists between the current record and the current UR agreement. Processing then jumps to a process block 1816. Returning to the decision block 1809, If the procedure code 503 in the current record does not match the procedure code range in the current UR agreement then processing proceeds to a decision block 1811 for further correlation testing.

In the process block 1811, a first four digits of the procedure code 503 in the current record are compared with a first four digits of the procedure code range in the current UR agreement. If the first four digits of the procedure code 503 in the current record match the first four digits of the procedure code range in the current UR agreement, then processing proceeds to a process block 1812 where the MatchCode is set to a numeric of value 2 to indicate that a modest correlation exists between the current record and the current UR agreement. Processing then jumps to a process block 1816. Returning to the decision block 1811, If the first four digits of the procedure code 503 in the current record do not match the first four digits of the procedure code range in the current UR agreement, then processing proceeds to a decision block 1813 for further correlation testing.

In the process block 1813, a first three digits of the procedure code 503 in the current record are compared with a first three digits of the procedure code range; in the current UR agreement. If the first three digits of the procedure code 503 in the current record match the first three digits of the procedure code range in the current UR agreement, then processing proceeds to a process block 1814 where the MatchCode is set to a numeric of value 1 to indicate that a low correlation exists between the current record and the current UR agreement. Processing then jumps to a process block 1816. Returning to the decision block 1813, if the first three digits of the procedure code 503 in the current record do not match the first four digits of the procedure code range in the current UR agreement, then processing proceeds to a process block 1815 where the MatchCode is set to 0 to indicate that no correlation exist between the current record and the current UR agreement. Processing then proceeds to a process block 1817.

In the process block 1816 the date of service 502 in the current record is compared with a range of dates in the current UR agreement. If the date of service 502 in the current record falls within the range of dates specified in the current UR agreement, then a binary flag, DateFlag, is set to a value TRUE. Processing then proceeds to a process block 1817 where a UrPriority, based on the MatchCode and DateFlag, is assigned to the current UR agreement. Processing then proceeds to a process block 1818 where the UrPrioritr, the MatchCode, the CaseNumber, and the DateFlag are stored in a list called the UrPriorityList. Processing then proceeds to a decision block 1819 which checks to see if there are more unprocessed records in the UrList. If there are more unprocessed records in the UrList, then processing jumps back to the process block 1806 where a new current UR agreement is selected. If there are no more unprocessed records in the UrList, then processing proceeds to a decision block 1820.

The decision block 1820 checks to see how many records are in the UrPriorityList. If the UrPriorityList is empty, then processing jumps ahead to a process block 18,!3. If the UrPriorityList is not empty, then processing proceeds to a process block 1821 wherein the UrPriorityList is sorted by UrPriority. Processing then proceeds to a process block 1822 where the UrPriorityList is presented to a human operator for review. In the process block 1822, the operator determines which, if any, of the UR agreements in the UrPriorityList should be applied to the current record. The operator designates a selected UR agreement. Once the operator has selected a UR agreement from the UrPriorityList, processing proceeds to a process block 1823.

In the process block 1823 a set of applicable rule sources is selected. The possible sources are state rules (S), payor 106 rules (C), and generic rules (G). More than one source of rules can be selected. Processing then proceeds to a process block 1824 where all of the selected rule sources are searched for rules applicable to the selected UR agreement. All rules found to be applicable are stored in a RuleList. Processing then proceeds to a process block 1825 where the RuleList is sorted by highest UR priority. Processing then proceeds to a process block 1826 where the rule list is searched for a first rule which matches the procedure code and modifier in the current UR agreement. Processing then proceeds to a decision block 1827. Decision block 1827 whether the first rule was found in process block 1826. If no first rule was found in process block 1826, then processing jumps ahead to a process block 1830. If, on the other hand, a first rule was found in process block 1826 then processing proceeds to a process block 1828. In the process block 1828 a BindFlag is set if the first rule is binding. Also in process block 1828, a MandFlag is set if the first rule is mandatory. Processing then proceeds to a step 1829 where: a level of the first rule is stored in the current record's rule level field 506, a sequence number of the first rule is stored in the current record's rule sequence number 507; the BindFlag is stored in the BindFlag field 508, and the MandFlag is stored in the MandFlag field 509 of the current record.

Processing then proceeds to a decision block 1830 which checks to see if there are more unprocessed records (each record corresponding to a line 110) in the bill database 120. If the are more unprocessed records, then processing jumps back up to process block 1803 to process the next record. If there are no more unprocessed records, then processing proceeds to a final process block 1831 where the Bill database 120 and UR database 122 are closed.

II. The Procedure Code Matching (Correlation) Algorithm

B. Matching

As stated previously, two of the key features of the present invention are the ability to code the UR agreements 107 into a format that can be used by a computer amid the ability to correlate the UR agreements to the specific lines 110 of a medical bill 109. In the preferred embodiment, both processes rely heavily on the use of the standard American Medical Association (AMA) CPT-4 codes for describing medical treatments. Table 1. lists a small subset of these codes show the CPT codes for various procedure used in physical medicine.

TABLE 1

| CPT Code | Treatment |
| --- | --- |
| 97500 | Orthotics training (dynamic bracing, splinting), upper and/or lower extremities; initial 30 minutes, each visit |
| 97501 | each additional 15 minutes |
| 97520 | Prosthetic training; initial 30 minutes, each visit |
| 97521 | each additional 15 minutes |
| 97530 | Kinetic activities to increase coordination, strength and/or range of motion, on area (any two extremities or trunk); initial 30 minutes, each visit |
| 97531 | each additional 15 minutes |

As seen in Table 1., the CPT codes use a five digit number to identify the various treatments. Ideally the UR agreement 107 would specify a single CPT code associated with the treatment authorized by the UR agreement and the provider 104 would use the proper CPT code in the medical bill 109. Unfortunately, this does not always happen. The number of different treatments, and the number of different codes associated with these treatments is staggering. Oftentimes, the differences between treatments are :subtle and thus Providers 104 and Payors 106 make mistakes in entering the codes. For example, in the table above, the only difference in the treatment associated with the 97500 code and the treatment associated with the 97501 code is the length of time. The 97500 code is used for the first 30 minutes of treatment, the 97501 code is used thereafter. A nurse or physician administering treatment could mistakenly use the 97500 code for a one hour treatment rather than the combination of the 97500 and the 97501 code. Thus it becomes apparent that any algorithm which attempts to merely match the five digit code is sure to generate many failures in attempting to match a procedure code on a medical bill 109 to a procedure code in a UR agreement 107.

The matching method in the preferred embodiment reduces the number of failures by exploiting a structure of the CPT codes and by looking for close correlation rather than an exact match. The CPT codes are structured such that changes in the least significant decimal digit reflect small changes in the nature of the treatment. Changes in successively more significant digits between two different CPT codes reflect, successively, more significant differences in treatment. Thus, for example, the closely related 97500 and 97501 codes used in the above example only differ in the least significant digit. The similar treatments of orthotics training (code 97500) and prosthetic training (code 97520) differ in the next to least significant digit.

This inherent structure allows three mechanisms to be employed to assign a probability of correlation between the procedure code in the bill 109 and the procedure code in the UR agreement 107. First, a procedure code is not necessarily stored in the UR record 800 as a single number, but rather a range of procedure codes is allowed. This range of codes is stored in the UR record 800 as a first procedure code 808 and a second procedure code 809. All procedure codes between the first procedure code 808 and the second procedure code 809 are within the range of procedure codes for that UR record 800. Thus, when attempting to correlate lines 110 to UR agreements 107, any procedure code found in the line 110 which falls within the range of codes specified in the UR record 800 will be considered a match.

The second mechanism involves the use of fewer than the full five digits of the procedure code. This is shown in the flowchart of FIG. 18. In FIG. 18, the process block 1809 looks at all five digits of the procedure code. If no match is found, then processing proceeds to process block 1811, where only the four most significant digits are compared. Thus, in the example above, suppose that the UR agreement properly used the 97501 code for treatment periods beyond 30 minutes, but that the provider 104 wrongly entered the CPT code 97500. Process block 1809 would not detect a procedure code match and thus would not correlate the UR agreement 107 with the line 110. However, process block 1811, which only looks at the first four digits, would detect a match and thus properly correlate the UR agreement 107 to the line 110. This concept of looking at successively fewer digits of the CPT code is continued in process block 1813 where only the first three digits are compared. This technique could be continued until only the first significant digit was being examined. In the preferred embodiment, the correlation process stops when three significant digits have been compared. Beyond that point, the correlation is so weak that in all likelihood, the UR agreement 107 does not match the line 110.

The third, and final, technique used to correlate the procedure codes is to add a procedure code modifier. The strongest correlation test occurs in decision block 1807 where all five digits of the procedure codes are compared, and a procedure code modifier in the UR agreement and a procedure code modifier in the line 110 match.

In addition to comparing procedure codes, the system may use the dates of treatment to attempt to correlate the UR agreements 107 to the lines 110. As with procedure codes, an exact match is overly restrictive, so a range of dates is provided in the UR record 800. The beginning date field 805 and the ending date field 806 define this range. In the algorithm of FIG. 18, once some correlation between a particular UR agreement 107 and a particular line 110 has been established, the date found in the line 110 is checked to see if it falls within the range of dates in the UR agreement 107. If the date from the line 110 does fall within the range specified by the UR agreement 107, then the probability that the UR agreement covers the line 110 is increased.

In an alternative embodiment, the statutory Relative Value Schedule (RVS) c(odes are used in place of the CPT codes disclosed above. The RVS codes are similar to the CPT codes in that the code values for closely related treatments vary only in the least significant digits. Therefore, although the process herein is described in terms of the CPT codes, one skilled in the art will recognize that the statutory RVS codes could be used in a manner similar to the CPT codes.

B. Pass All and Select All

In a particularly preferred embodiment of the invention, a human operator is presented with a list of possible UR agreements that have some possibility of matching a particular line 110. The operator can then review the line 110 and the UR agreements in the UrPriorityList to determine which, if any, to apply. If none are appropriate, the operator can use a command "pass all," in which case no UR agreements are applied to the bill 109. Alternatively, the operator can use a command "select all" in which case a UR agreement selected from the UrPriorityList is applied to all lines 110 in the bill 109.

III. Additional Embodiments

Although particular embodiments of the present invention have been described and illustrated above, those skilled in the art will appreciate that various changes and modifications can be made to the present invention without departing from its spirit. Accordingly, the scope of the present invention should not be limited to the foregoing discussion but should be defined by the appended claims.

What is claimed is:

1. A medical cost containment system for allowing a medical cost payor to correlate medical bills from a medical service provider with utilization review (UR) agreements between said payor and said provider, said cost containment system comprising:

a computer processor operatively coupled to a memory;

a UR database containing said UR agreements;

database access software stored within said memory, said database access software configured to allow retrieval of records from said UR database;

an invoice from said provider stored within said memory, said invoice having at least one itemized request for payment; and correlation software stored within said memory, said correlation software configured to correlate said itemized request to said UR agreements;

said correlation software further configured to at least adjust an amount of said at least one itemized request for payment in accordance with said UR agreement or approve payment of at least one itemized request for payment in accordance with said UR agreement or flag at least one itemized request for payment for further review in accordance with said UR agreement.

2. The medical cost containment system of claim 1, wherein said itemized request is stored within said memory using a first numeric code, said first numeric code being selected from a table, said table listing specified numeric codes and medical services corresponding to said specified numeric codes, said specified numeric codes chosen such that similar medical services are represented by specified numeric codes that differ only in the least significant digits, said UR agreements stored in said UR database using second numeric codes, said second numeric codes selected from said table, said correlation software correlating said UR agreements with said itemized request for payment by matching as many significant digits as possible from said first numeric code with as many significant digits as possible from said second numeric codes.

3. The medical cost containment system of claim 1, wherein said UR database prioritizes said UR agreements.

4. The medical cost containment system of claim 1, wherein said UR agreements comprise descriptions of specific medical treatments and services and the quantity, duration, or dates of said medical treatments and services.

5. The medical cost containment system of claim 4, wherein said descriptions of specific medical treatments and services comprise alphanumeric codes.

6. The medical cost containment system of claim 5, wherein said alphanumeric codes comprise AMA CPT-4 codes.

7. A medical cost containment system for allowing a medical cost payor to correlate medical bills from a medical service provider with utilization review (UR) agreements between said payor and said provider, said cost containment system comprising:

a computer processor operatively coupled to a memory;

a UR database containing said UR agreements;

database access software stored within said memory, said database access software configured to allow retrieval of records from said UR database;

an invoice from said provider stored within said memory, said invoice having at least one itemized request for payment; and correlation software stored within said memory, said correlation software configured to determine a probability of correlation between each of said itemized requests and each of said UR agreements;

said correlation software further configured to at least adjust an amount of said at least one itemized request for payment in accordance with said UR agreement or approve payment of at least one itemized request for payment in accordance with said UR agreement or flag at least one itemized request for payment for further review in accordance with said UR agreement.

8. A method for attempting to ensure that, in a managed care system, a utilization review (UR) agreement for medical services is properly enforced such that an anticipated cost savings under said UR agreement are realized, said method comprising the steps of:

storing said UR agreement in a computerized UR database;

entering an itemized request for payment from a bill for medical services into a computer;

correlating said UR agreement with said itemized request for payment;

determining whether said itemized request for payment is proper under said UR agreement; and adjusting an amount of said at least one itemized request for payment in accordance with said UR agreement or approving payment of at least one itemized request for payment in accordance with said UR agreement or flagging at least one itemized request for payment for further review in accordance with said UR agreement.

9. The method of claim 8 wherein said UR database contains a plurality of UR agreements.

10. The method of claim 9, further comprising the step of prioritizing the correlation between said itemized request for payment and said plurality of UR agreements stored in said UR database.

11. The method of claim 8, wherein said UR database is a distributed database.

12. The method of claim 8, wherein said UR agreements comprise descriptions of specific medical treatments and services and the quantity, duration, or dates of said medical treatments and services.

13. The method of claim 12, wherein said descriptions of specific medical treatments and services comprise alphanumeric codes.

14. The method of claim 13, wherein said alphanumeric codes comprise AMA CPT-4 codes.

15. The method of claim 14, wherein said itemized request for payment comprises AMA CPT-4 codes.

16. The method of claim 15, wherein said step of correlating said UR agreements with said itemized request for payment comprises matching as many digits as possible between said AMA CPT-4 code in said UR agreement and said AMA CPT-4 code in said itemized request for payment.

17. The method of claim 14, wherein said alphanumeric codes comprise statutory Relative Value Schedule (RVS) Codes.

18. The method of claim 17, wherein said step of correlating said UR agreements with said itemized request for payment comprises matching as many digits as possible between said RVS code in said UR agreement and an RVS code in said itemized request for payment.

19. The method of claim 17, wherein said step of correlating said UR agreements with said itemized request for payment comprises matching as many significant digits as possible between said RVS code in said UR agreement and an RVS code in said itemized request for payment.

20. A method for correlating imperfect matches between coded service items in a bill and a service authorization agreement, said method comprising the steps of:

storing said service authorization agreement in a computerized agreement database;

entering into a computer an itemized request for payment from said bill;

correlating said service authorization agreement with said itemized request for payment; and determining whether said itemized request for payment is proper under said service authorization agreement.

21. The method of claim 20 wherein said agreement database contains a plurality of service authorization agreements.

22. The method of claim 21, further comprising the step of prioritizing the correlation between said itemized request for payment and said plurality of service authorization agreements stored in said agreement database.

23. The method of claim 20, wherein said authorization database is a distributed database.

24. The method of claim 20, wherein said service authorization agreements comprise descriptions of specific services, said descriptions comprising a quantity, a duration, or a date of said services.

25. The method of claim 24, wherein said descriptions of specific services comprise first alphanumeric codes.

26. The method of claim 25, wherein said itemized request for payment comprises a second alphanumeric code.

27. The method of claim 26, wherein said step of correlating said service authorization agreements with said itemized request for payment comprises matching as many characters as possible between said alphanumeric code in said service authorization agreement and said alphanumeric code in said itemized request for payment.

28. The method of claim 27, wherein said alphanumeric codes comprise statutory Relative Value Schedule (RVS) Codes.

29. The method of claim 27, wherein said alphanumeric codes comprise AMA CPT-4 codes.

30. The method of claim 26, wherein said alphanumeric codes comprise numeric codes chosen such that similar services are represented by numeric values that differ only in the least significant digits, such that said step of correlating said service authorization agreements with said itemized request for payment comprises matching as many digits as possible between said second alphanumeric code and said first alphanumeric codes.

31. The method of claim 30, further comprising the step of using additional data to determine correlation between said request for payment and said service authorization agreements, said additional data comprising dates of service, quantity of service, and duration of service.

* * * * *